Sept. 13, 1955  R. R. SEEBER, JR  2,717,686
WORD WRITING TYPEWRITER

Filed Nov. 5, 1952  11 Sheets-Sheet 4

*INVENTOR.*
ROBERT R. SEEBER Jr.

BY *Joseph B. Taphorn*
*ATTORNEY*

Sept. 13, 1955   R. R. SEEBER, JR   2,717,686
WORD WRITING TYPEWRITER
Filed Nov. 5, 1952   11 Sheets-Sheet 5

INVENTOR.
ROBERT R. SEEBER Jr.
BY Joseph B. Taphorn
ATTORNEY

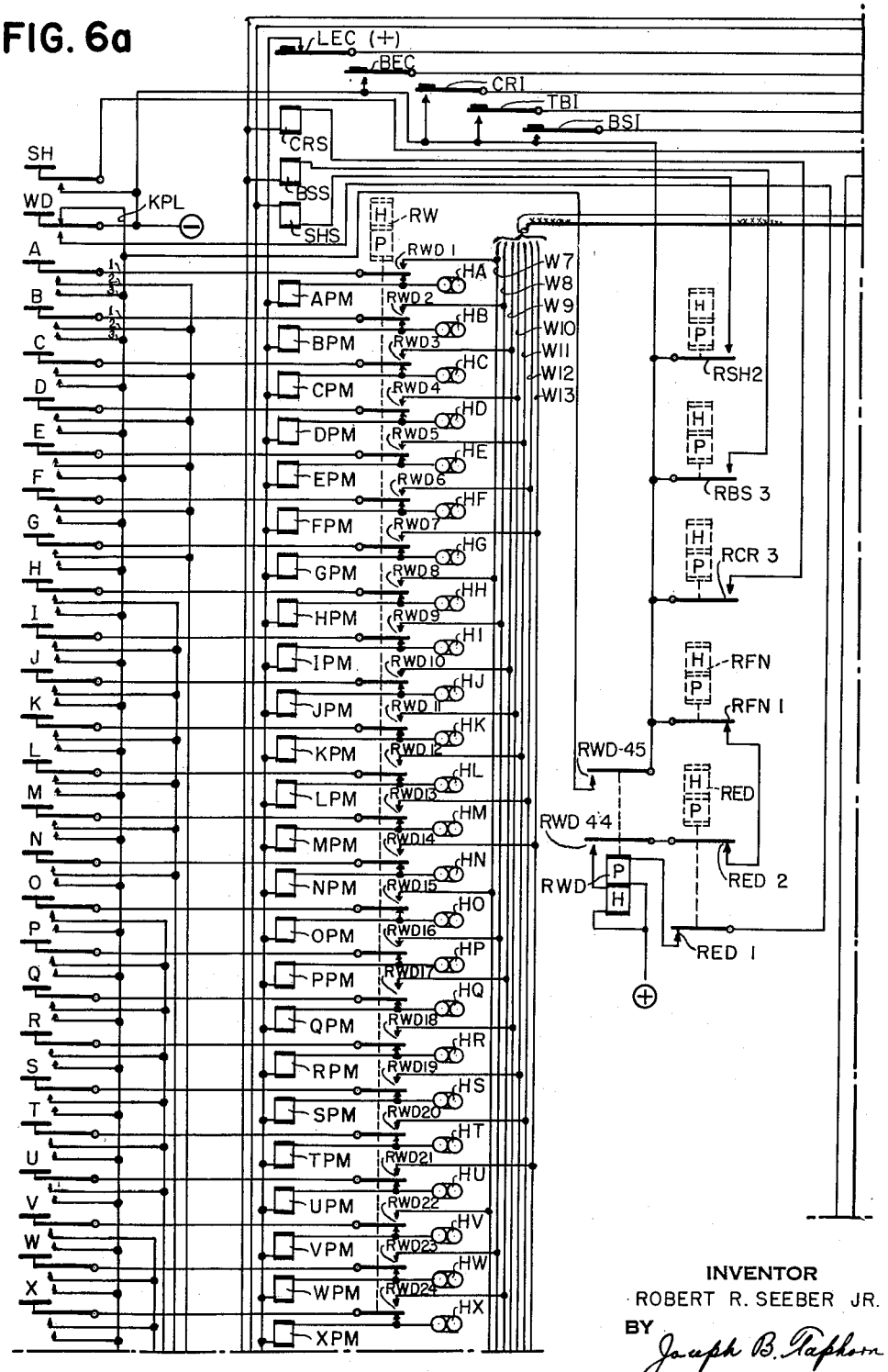

Sept. 13, 1955     R. R. SEEBER, JR     2,717,686
WORD WRITING TYPEWRITER

Filed Nov. 5, 1952     11 Sheets-Sheet 8

INVENTOR
ROBERT R. SEEBER JR
BY
*Joseph B. Taphorn*
ATTORNEY

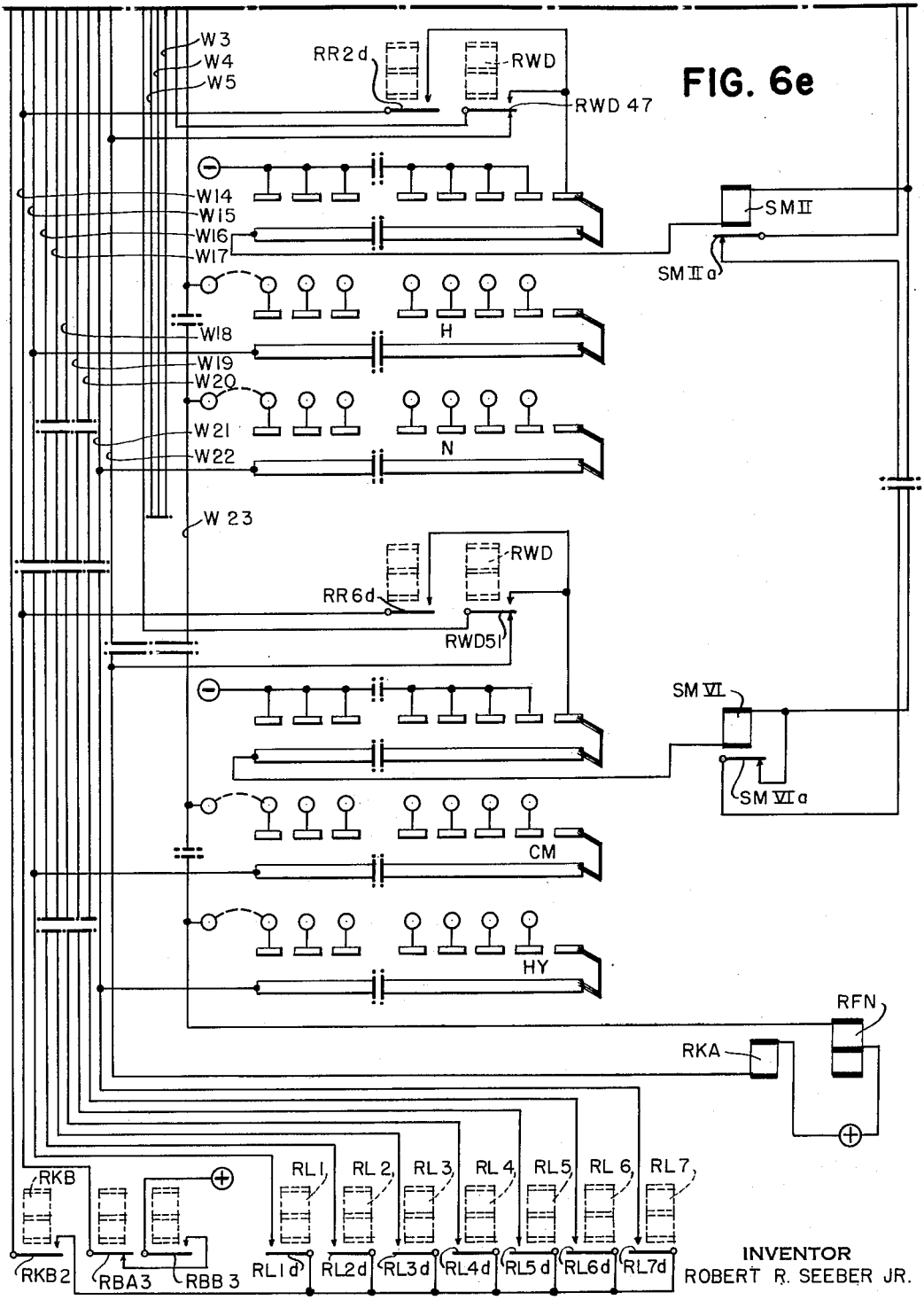

Sept. 13, 1955    R. R. SEEBER, JR    2,717,686
WORD WRITING TYPEWRITER
Filed Nov. 5, 1952    11 Sheets-Sheet 11

|  |  |  | W7 | W8 | W9 | W10 | W11 | W12 | W13 |
|---|---|---|---|---|---|---|---|---|---|
|  |  |  | RL1 | RL2 | RL3 | RL4 | RL5 | RL6 | RL7 |
|  |  |  | RC1 | RC2 | RC3 | RC4 | RC5 | RC6 | RC7 |
| W1 | SM I | RR1 | A | B | C | D | E | F | G |
| W2 | SM II | RR2 | H | I | J | K | L | M | N |
| W3 | SM III | RR3 | O | P | Q | R | S | T | U |
| W4 | SM IV | RR4 | V | W | X | Y | Z | 2 | 3 |
| W5 | SM V | RR5 | 4 | 5 | 6 | 7 | 8 | 9 | 0 |
| W6 | SM VI | RR6 | Cm | Pd | Sı | Sc | Ap | ½ | Hy |

INVENTOR.
ROBERT R. SEEBER Jr.
BY Joseph B. Taphorn
ATTORNEY

United States Patent Office 2,717,686
Patented Sept. 13, 1955

2,717,686
WORD WRITING TYPEWRITER

Robert R. Seeber, Jr., New York, N. Y., assignor to International Business Machines Corporation, New York, N. Y., a corporation of New York Application November 5, 1952, Serial No. 318,815

20 Claims. (Cl. 197—7)

This invention relates to typewriting machines and more particularly to typewriting machines of the type capable of printing not only an individual character but also groups of such individual characters, such as words and phrases each time a key is depressed.

Word writing typewriters, as these machines are otherwise known, have been previously devised, and as an example of this, reference may be had to Patent No. 1,275,657, issued to one A. R. Bullock. Such machines have required extra sets of special keys, one for each word or phrase to be printed and hence have had a limited capacity as the number of extra keys that can be usefully located on a typewriter keyboard is very limited.

Accordingly it is an object of this invention to provide a word writing machine of greatly enlarged capacity and more specifically, one wherein by the depression of only one special key, each of the forty-two or so character keys on a keyboard may be depressed to call in a separate word or phrase. Furthermore, it is envisioned that such a special key need not be located so as to clutter up the existing keyboard, and that it may be embodied in the form of a foot pedal conveniently accessible to the operator of the machine.

Another object of the invention is to provide a word writing machine in which any character key can be used to pick up any word regardless of its first character. Thus the first letter of a word need not be that of the character key. Also, a character may be used to designate a function, for example, depression of the *d* key could result in the writing of the date.

A further object of the invention is to provide a word writing typewriter which may be readily set up to furnish a large vocabulary of words and phrases of relatively great length, or alternatively to furnish a smaller selection of sentences and paragraphs, or even to write a complete letter in those cases in which many copies of the same letter are sent because it would be considered ill-advised to send printed forms instead of typewritten letters.

A more specific object of the invention is to provide a word writing typewriter that effects the printing of words or phrases at a high rate of speed.

Another object of the invention is to provide a word writing machine that is extremely flexible in operation and one in which the sequential operation may be momentarily slowed down to accommodate the relatively longer operation of various machine function mechanisms.

Yet another object of this invention is to provide for the automatic continuance of printing on the following line whenever the end of one of the earlier words of a phrase is written near the end of the line.

A further object of the invention is to provide for the automatic continuance of printing at the beginning of the next line when a hyphen is printed near the end of the line.

Still another object of this invention is to provide a word writing machine capable of automatically and correctly hyphenating long words accidentally being written at the end of a line.

A further object of the invention is to provide for the optional capitalization of the first letter of a word or phrase. Thus a word normally used later in a sentence, could be capitalized when used as the first word without disturbing the normal operation of the word writing machine.

Other objects of the invention include the provision of a word writing typewriter that is extremely accurate and reliable in operation and yet simple and economical of manufacture.

These and other objects, features and advantages thereof will be pointed out in the following description and claims and illustrated in the accompanying drawings, which disclose, by way of examples, the principle of the invention and the best mode, which has been contemplated, of applying that principle.

Figure 6B:
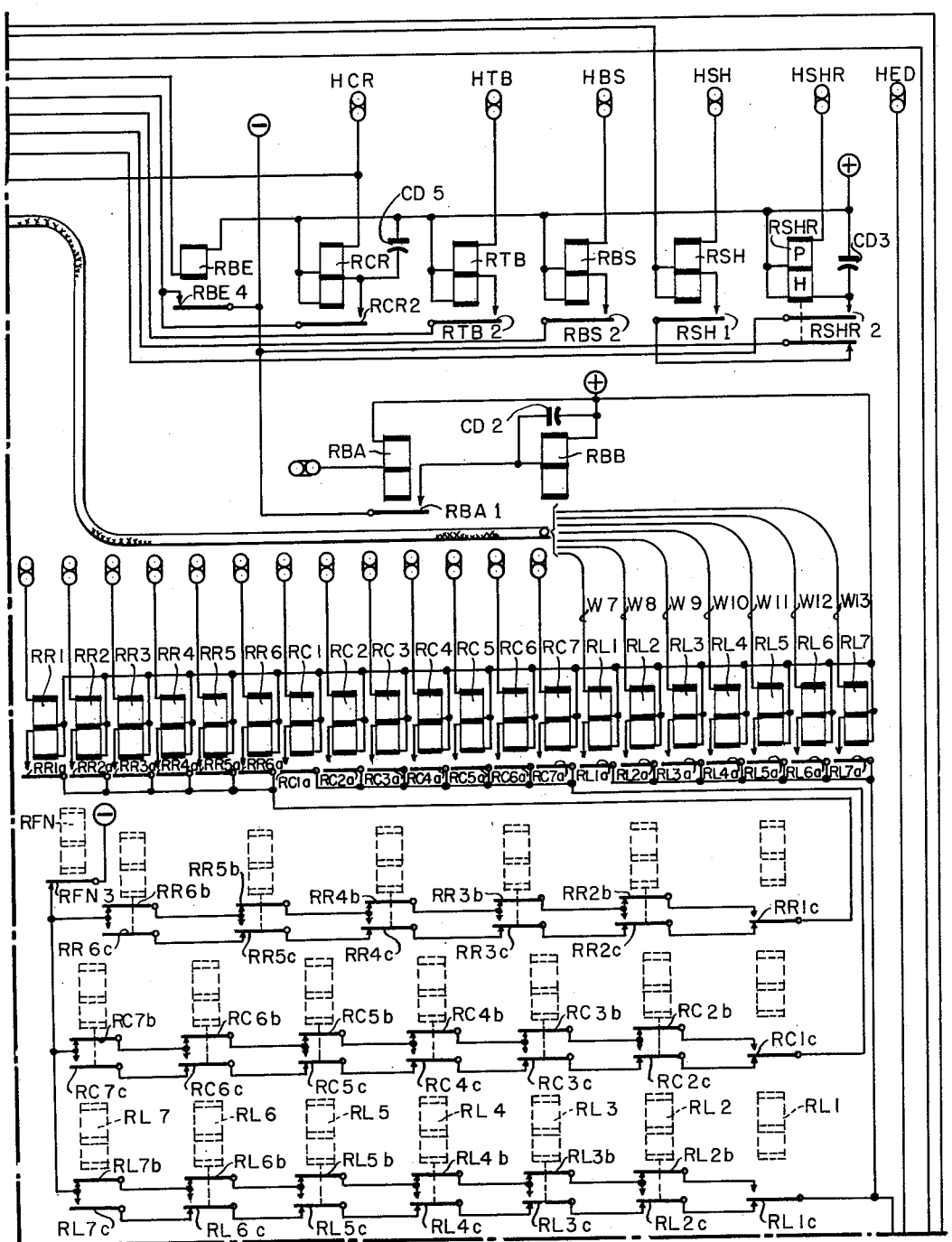
Figure 6C:
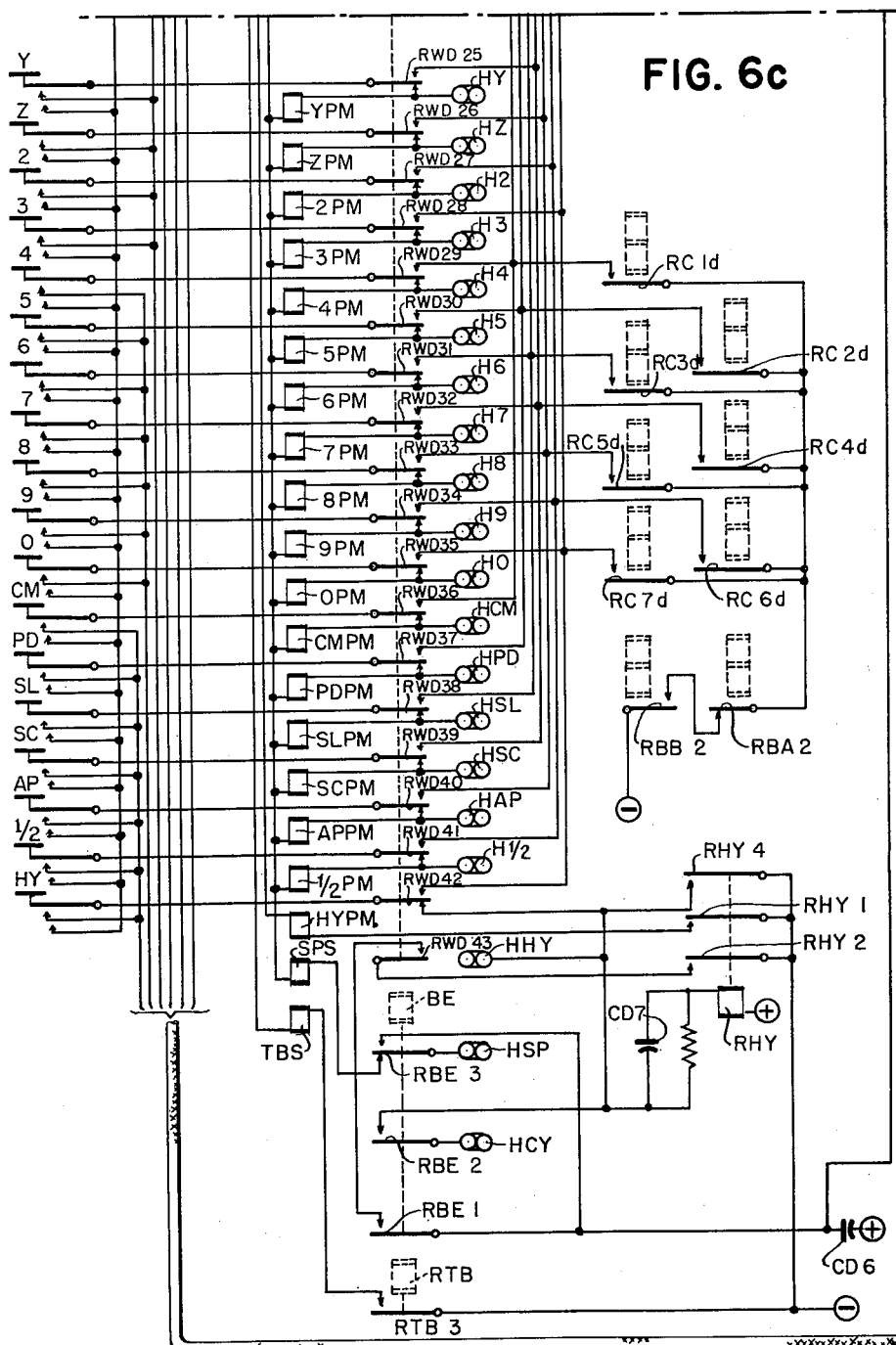
Figure 6D:
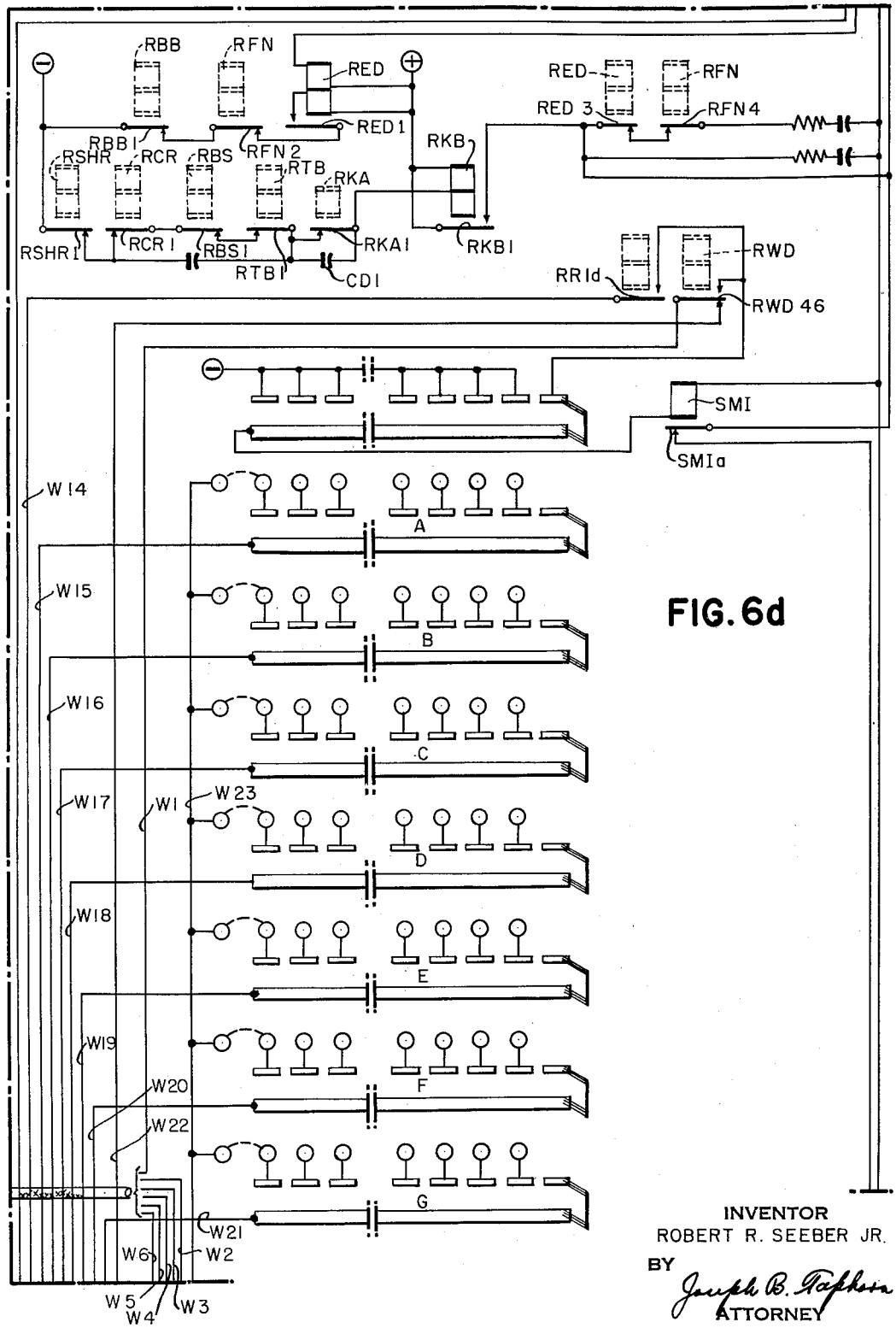

Figs. 6a, 6b, 6c, 6d and 6e, disclose when assembled with Fig. 6b to the right of Fig. 6a, and Figs. 6c and 6d respectively beneath Figs. 6a and 6b and Fig. 6e beneath Fig. 6d, a wiring diagram of the invention.

Figures 7, 8:
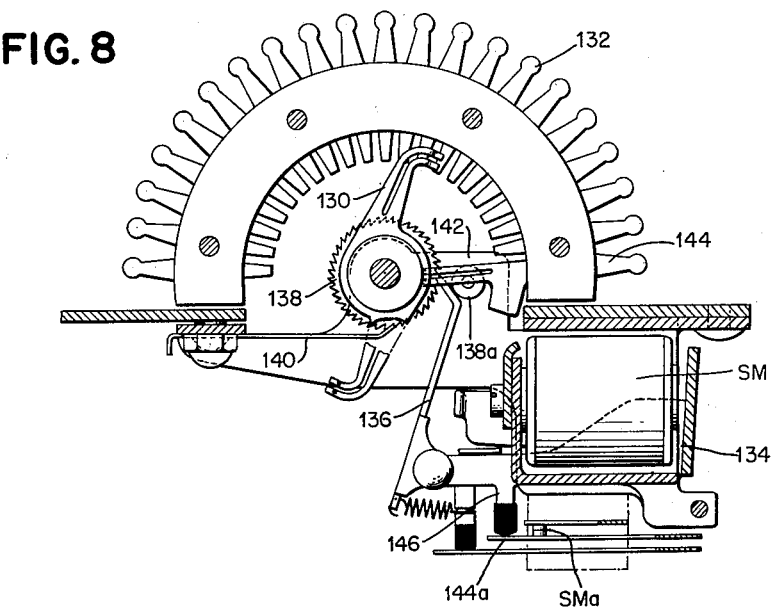

Fig. 7 is a chart showing by columns and rows various related instrumentalities disclosed in the wiring diagram.

Fig. 8 is a side view of an instrumentality diagrammatically shown in the wiring diagram.

According to the invention, a typewriter is arranged so that the typist can type an entire word or phrase by depressing a pair of keys. A "Word" key is provided the use of which is similar to that of the "Shift" key. For example, the "A" key operates lower-case "a" normally. If the "Shift" key is depressed, the "A" key operates upper-case "A." Similarly the Word-writer can be arranged so that the "A" key operates to print the entire word "about" if the "A" key and the "Word" key are depressed at the same time.

Similarly, all the other character keys, in conjunction with the "Word" key, call out successions of operations producing words or phrases. For example, the "O" key might give "order"; the "R" key, "received"; the "P" key, "please"; the "V" key, the phrase "very truly yours." In these examples, the control key was chosen to be the initial letter key of the word or phrase associated with it. This convenient arrangement would be maintained where possible, but need not necessarily obtained. For example, having used the "A" key to control the common word "about," another common word "appreciate" could be placed under control of the "X" key; also, the "3" key could be used to control the three-word phrase, "at your request." Thus it is seen that the typist has under her control as many as 42 or so different words or phrases if all character keys are present and assigned to a word-memory function.

Referring more particularly to the drawings, there has been disclosed in Figs. 1 to 5, portions of a well known form of an electrically-driven power-operated typewriting machine known commercially as the "IBM Electric" and to which the invention has been applied. It will be understood, however, that the invention is not limited to embodiment in the form of typewriter illustrated and may be embodied in various other typewriters upon suitable modification of various instrumentalities.

Since the typewriter mentioned is well known in the art, only representative portions thereof which are modified or interconnected with new instrumentalities have been shown. Thus a representative type bar operating mechanism has been shown because of modifications therein (principally of changing the keyboard to the electrical contact type), and portions of the carriage return mechanism, the back space mechanism, and the tabulation mechanism have been shown because their operation controls the opening and closing of certain interlock contacts. A showing has been made of the rear portions of the typewriter frame and of the platen carriage because carriage movement effects the closing of one set of contacts at the same time that it operates the bell clapper and of another set of contacts when the end of the line is reached.

Figure 1:
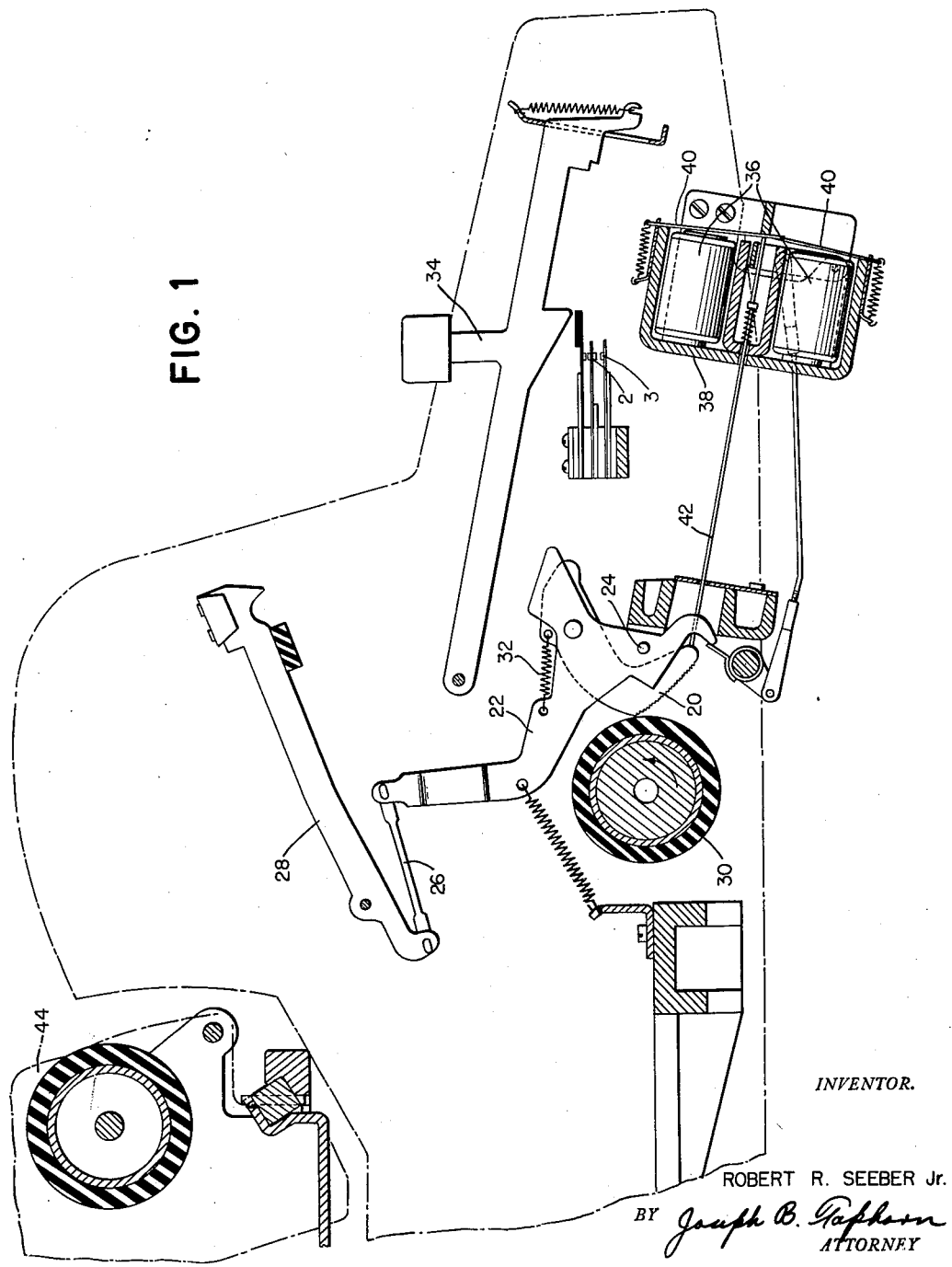
Fig. 1 is a vertical sectional view through a machine embodying the present invention.

The type bar operating mechanism shown in Fig. 1 is generally of the type disclosed in the U. S. Patent No. 2,506,444, issued to R. D. Dodge. This type of operating mechanism includes an eccentric cam 20 pivoted on a lever 22. The lever pivots at its lower end on a rod 24 and is connected at its upper end via a link 26 to an extension of a corresponding type bar 28. The cam 20 is normally held out of engagement with a continually rotatable frame roller 30 by a spring 32. Operation of the type bar is obtained by moving the cam until its eccentric portion engages the roller. The roller then rotates the cam and, due to the cam's eccentricity, the lever in turn is rotated and acts through the link to move the type bar. The momentum of the mechanism carries the cam free of the roller and permits it to restore before the lever and type bar restore.

In the Dodge patent, a mechanical connection is employed between a character key 34 and its corresponding cam 20 to trip the cam. In the instant embodiment the tripping of these type bar operating cams is effected through the use of individual electromagnetic means, the energization of which may be effected respectively by the depression of the various character keys.

The electromagnet means may be of any conventional type, but preferably are such as those disclosed in the copending application Serial No. 201,898, filed December 21, 1950, by K. S. Goodale and D. L. Kilcrease, now Patent No. 2,687,199, and to which reference may be had if desired. A plurality of aligned print magnets 36 are arranged in superimposed rows and staggered with respect to each other in a holding frame 38 which may be attached to the typewriter frame as a unit. Each magnet has a pivoted armature 40 related thereto which may reciprocate a corresponding operating rod 42 against a respective type bar operating cam, thereby projecting the related cam into contact with the rotatable power roll 30. It should be clear that one magnet is provided for each key lever and cam assembly so that the magnets may be selectively energized to effect a typing operation.

The character keys 34 control the respective print magnets 36 by closing a set of contacts associated with each key. Each set of contacts has been diagrammatically shown as including three normally separated elements 1, 2 and 3 which are closed when the corresponding key is depressed. Suitable circuits are provided, as will be explained later, whereby the closing of these contact elements results in the picking up of the associated type bar operating magnet.

Figure 2:
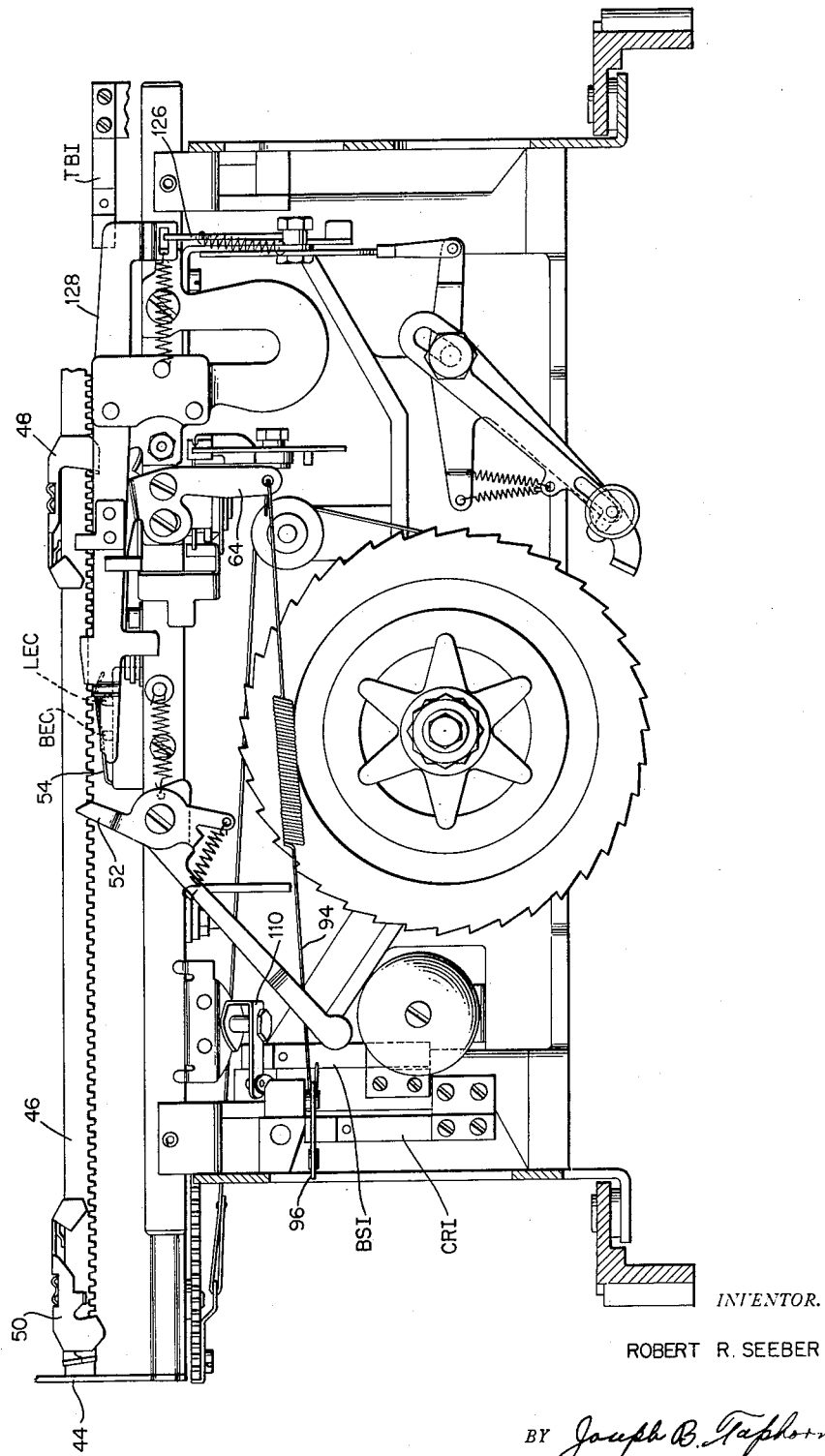
Fig. 2 is a fragmentary rear view of a machine embodying the present invention.

As is well known in the art and shown in Fig. 2, typewriters are provided with a platen carriage 44 which advances the paper being typed upon past a printing point. It is also well known to mount a rack 46 on such carriage and to provide adjustable left and right hand margin stops 48 and 50, respectively, on such a rack. The left hand margin stop 48 determines the amount of margin at the left hand side of the paper. The right hand margin stop 50, of course, fixes the right hand margin or line end position of the paper, and also operates a bell clapper 52 a selected number of typing spaces before the end of the line to establish a warning zone and thus give the operator ample opportunity to properly finish the typing on the line before beginning the typing of a new word on the next line. In the embodiment shown, the adjustable right hand margin stop 50 also controls a microswitch having a pair of normally open contacts so as to hold the contacts closed while the platen carriage is in the warning zone. These contacts have been designated as the bell contacts BEC and their purpose will be explained later.

The right hand margin stop 50 also closes a second microswitch or set of normally open contacts when the end of the line is reached. They have been designated as the line end contacts LEC and as seen in Fig. 2, are located immediately to the right of the bell contacts BEC. Their purpose will also be explained later. The margin stop 50 closes the contacts BEC and LEC by depressing the biased member 54.

Figure 3:
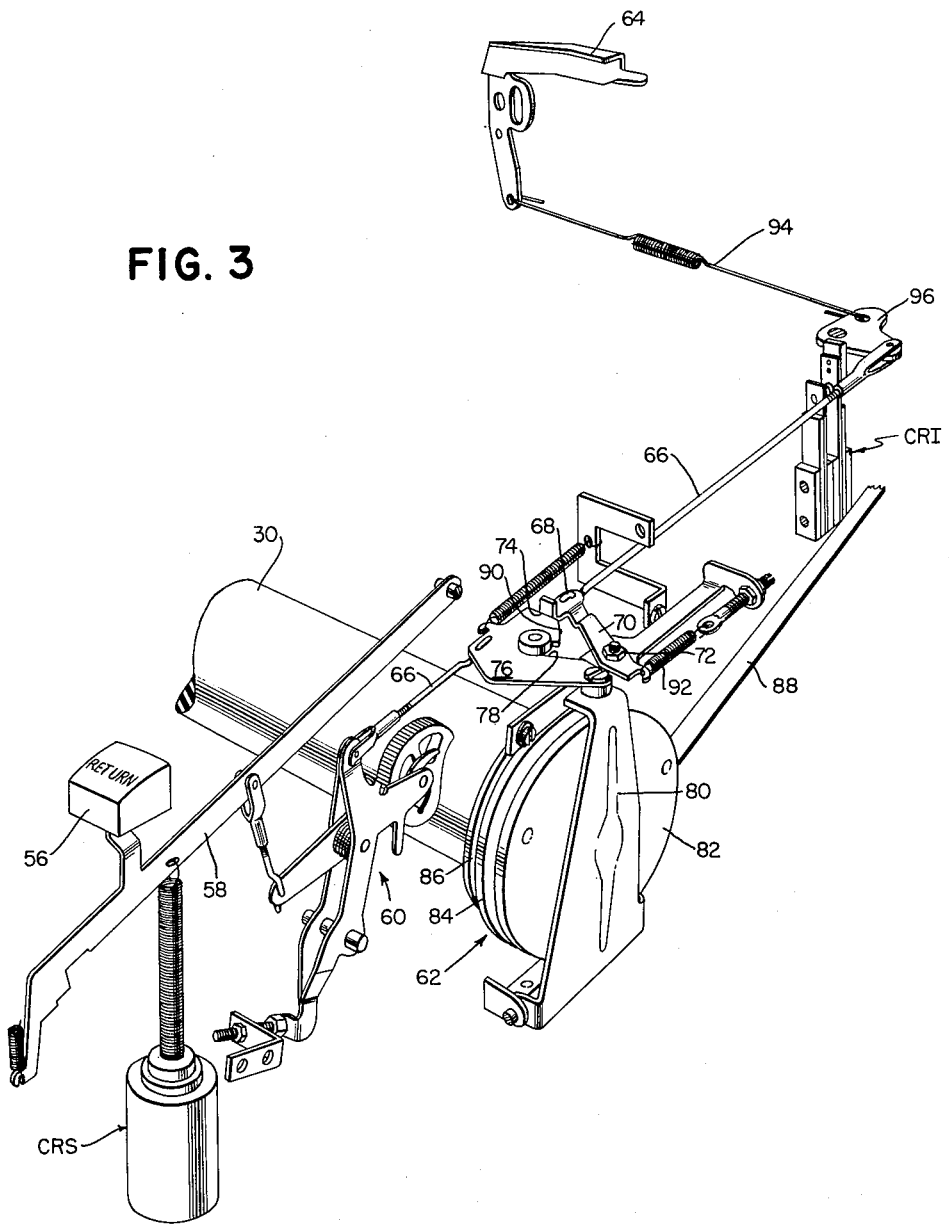
Fig. 3 is a view in perspective of another portion of the machine shown in Figs. 1 and 2.

Fig. 3 shows a portion of the carriage return mechanism normally employed in the "IBM Electric" typewriter. Generally, the mechanism includes a key 56 mounted on a lever 58 similar to that of the character key levers. The lever mechanically trips a non-repeat cam operated mechanism 60 operative to engage a carriage return clutch 62 and at the same time rock a clutch knockout lever 64 from a normal position to a position in the path of the left hand margin stop 48. When the clutch knockout lever is restored by the margin stop, it disengages the carriage return clutch and permits the cam operated mechanism to restore.

The carriage return cam operating mechanism is connected to the clutch and to the knockout lever through a clutch latch link 66. The clutch latch link has an offset portion 68 received in an aperture formed in a clutch latch lever 70. The clutch latch lever 70 is pivoted at 72 and, when the link 66 is pulled forward, the lever 70 is rotated and engages the rearward edge 74 of a clutch lever 76. The clutch lever 76 is diagonally slotted at 78 so that it undergoes forward and leftward movement when engaged by the clutch latch lever 70. This leftward movement of the clutch lever 76 effects a leftward movement of the clutch operating arm 80 to which it is pivotally connected. The leftward movement of the clutch operating arm 80 moves it against a clutch plate 82 which causes a clutch disc 84 to engage a clutch pulley 86. The power roll 30 then rotates the pulley to wind up the carriage return tape 88 and effect a platen carriage 44 movement to the right.

The clutch 62 is held in engagement by the action of the clutch latch lever 70. The rearward edge 74 of clutch lever is inclined at its right hand end 90 and the clutch latch lever 70 slips behind this inclined edge 90 as it moves the clutch lever 76 forwardly and to the left. In this position it effectively prevents the restoration of the clutch lever 76 and is itself held in this position by a spring 92.

The clutch is disengaged when the clutch knockout lever 64 is engaged by the left hand margin stop 48. The margin stop rotates the knockout lever which acts through a resilient link 94 to rotate a clutch latch bell crank 96 which pulls the clutch latch link 66 rearwardly to withdraw the clutch latch lever 70 from behind the inclined edge 90 of the clutch lever 76. The clutch elements will then automatically restore to disengaged position.

The carriage return mechanism holds closed during its operation a pair of interlock contracts CRI. The contacts are normally open and are operated by the rotation of the clutch latch bell crank 96. Their purpose will become evident later.

The carriage return mechanism may also be operated electrically. To this end a solenoid CRS is provided having its winding fixed to the frame and its core to the carriage return key lever 58. When the solenoid is energized, the core is pulled down and depresses the key lever to trip the cam mechanism as before.

Figure 4:
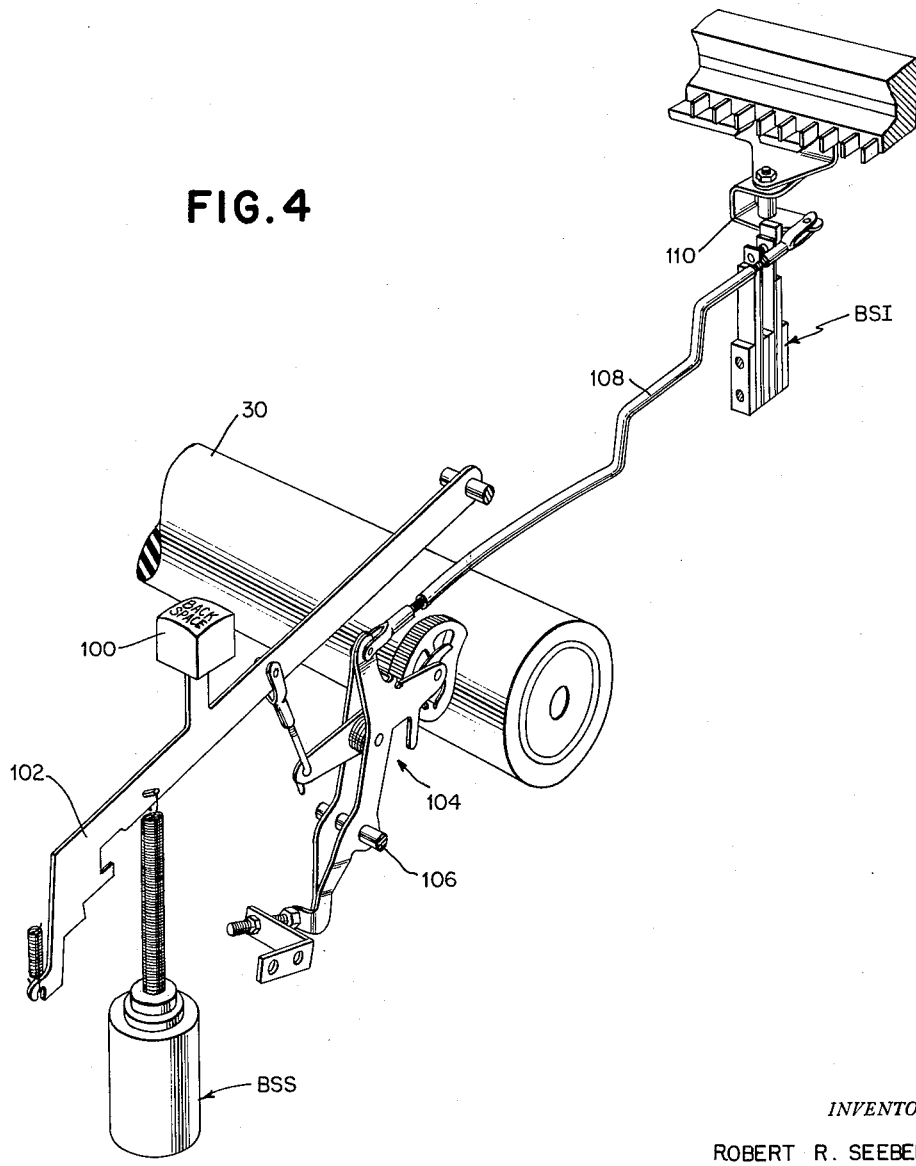
Fig. 4 is a view in perspective of still another portion of the machine shown in Figs. 1 and 2.
Figure 5:
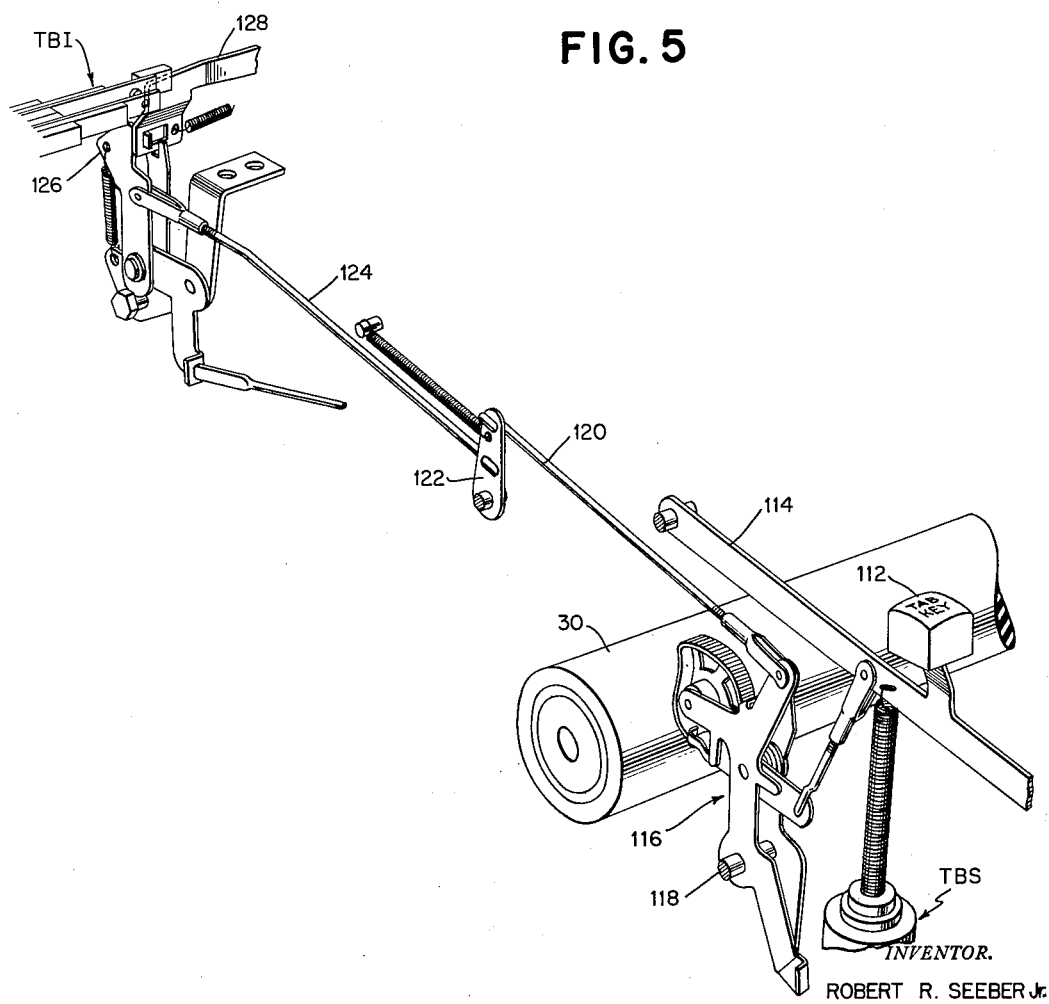
Fig. 5 is a view in perspective of yet another portion of the machine shown in Figs. 1 and 2.

A portion of the back space mechanism normally employed is shown in Fig. 4, and described in more detail in Patent No. 1,873,553, issued to C. W. Crumrine. Briefly, the back space key 100 is mounted on a lever 102 similar to that of the character keys. The lever mechanically trips a cam operated mechanism 104 pivoted at its lower end on a fixed member 106. The upper end of the cam operated mechanism is connected to the forward end of a link 108 connected at its rearward end to one arm of a bell crank 110. The other arm of the bell crank is operatively connected to a back space pawl (not shown).

In the instant embodiment the bell crank 110 is also operatively connected with a pair of normally open back space interlock contacts BSI which it holds closed during the back space operation. The purpose of these contacts will be made apparent hereinafter.

A solenoid BSS is connected with the back space lever 102 to enable operation of the back space mechanism through electrical means.

The IBM Electric typewriters are ordinarily furnished with a tabulating mechanism of the type disclosed in the U. S. Patent No. 1,935,436, also issued to C. W. Crumrine. In such tabulating mechanisms as may be seen in Fig. 5, a tabulating key 112 is mounted on a lever 114 similar to the character key levers and disposed at the left hand end of the keyboard. The lever 114 mechanically trips a non-repeat cam operating mechanism 116 pivoted at its lower end on a fixed member 118. The upper end of the cam operating is connected through a link 120, a lever 122, and another link 124 to a tab actuating lever 126 located at the rear of the machine. When tripped, the cam operating mechanism 116 rocks the tab actuating lever 126 which in turn rotates a tab lever 128. The shifting of the tab lever 128 effects the tabulating operation and it remains in its shifted position until this function has been completed. The tab lever 128 also holds closed a pair of normally open contacts while it is in a shifted position. These contacts have been designated as the tabulating interlock contacts TBI and their purpose will be made clear later.

In addition to those listed above typewriting machines are provided with mechanisms for performing at least two other functions namely, spacing and case shifting. The details of these mechanisms are unimportant other than to note that like the other function keys which mechanically actuate the associated operating mechanism, the space and shift keys are respectively associated with solenoids SPS and SHS whereby they may be depressed electrically, and that the shift key when depressed closes a pair of normally open contacts SH for reasons which will be explained later.

*Normal operating circuits*

The operation of the machine may be best understood by reference to the wiring diagram. In normal operation the depression of a character key effects the energization of a corresponding print magnet which results in the printing of the character corresponding to the key depressed. As has been pointed out, the depression of a character key results in the closing of three contact members which may be respectively denominated, 1, 2 and 3. The contact members 1 and 3 complete a circuit to the corresponding print magnet. A representative circuit may be traced for the "A" key as follows: From the minus side of the line through the normally closed points of the transfer switch WD, the respective 3 and 1 "A" key contact members, the normally closed points of transfer contact RW1, the print magnet APM, to the plus side of the line through a normally closed pair of line end contacts LEC, the normally closed points SMVI*a* through SMI*a*, and the now closed RKB1 contacts. The line end contacts prevent printing from taking place beyond the right hand margin. To reduce the energization of the print magnet APM to a mere pulse or shot, a second circuit is completed from the minus side of the line through the 3 and 2 key contact members, line W1, the normally closed points of a transfer contact RWD46, line W22, and a relay RKA, to the plus side of the line. The energization of relay RKA operates to open a normally closed pair of contacts RKA1 and thus interrupt a circuit through a second relay RKB. The dropping of relay RKB allows the contact points RKB1 in the print magnet circuit to open, thus limiting the length of the energization of the corresponding print magnet. A circuit through relay RKB may be traced from minus side of the line through the normally closed contacts RSHR1, the normally closed contacts RCR1, the normally closed contacts RBS1, the normally closed contacts RTB1, the normally closed contacts RKA1 and the relay RKB, to the plus side of the line. A condenser CD1 is connected across the normally closed points RKA1 to maintain the energization of the relay RKB for a brief time after the contacts RKA1 open. Thus the length of the pulse through the print magnets will be controlled by the size of the condenser used.

*Word writing circuits*

The special key provided to change the machine over from a single character printing machine to a word writing machine has been denominated as the word key WD. It controls a set of transfer contacts so that when it is depressed, a word relay RWD is energized and it operates sets of transfer contacts RWD1 through RWD42 so that the character print magnets PM are no longer in series with the 1 contact element of the corresponding keys. The circuit for the relay RWD is from the minus side of the line through the now transferred points of the contacts WD, the normally closed contacts RED1, the pickup coil P of relay RWD to the plus side of the line. The word relay RWD holds through its contacts RWD44 which connects one side of the hold coil H, connected on its other side to the plus side of the line, through normally closed points RED2 and normally closed points RFN1, to the minus side of the line. Thus only a momentary depression of the word key WD is necessary to change the machine over for a word writing operation.

The minus side of the line is restored to the key power line KJL whether or not the word key WD is released after the depression. A normally open contact RWD45 is closed by the energization of the word relay RWD and acts to dispose the key power line KPL in a circuit with the minus side of the line. This circuit is maintained as long as the word relay RWD remains energized.

To the end that each character key may be used to effect the writing of a different word or phrase, forty-two sets of successive pulses are made available through forty-two banks of outlet hubs and each one of forty-two character keys selectively controls the operation of one of the forty-two sets of pulses. Each print magnet and function controlling solenoid is connected in series parallel with one or more inlet hubs and it will be evident that by suitable plugging between the successively pulsed outlet hubs and the inlet hubs connected to the print magnets and the function controlling solenoids, that a desired word or phrase may be caused to be printed.

The forty-two sets of successive pulses are obtained through the use of six stepping switches. In the embodiment shown (Fig. 8) these steppinng switches are of a circular eight bank type in which eight double-armed brushes 130 are rotated past eight corresponding rows of twenty segments or contacts 132 mounted in a semi-circle by a spring-biased armature 134 carrying a pawl 136 biased into engagement with a ratchet wheel fixed to rotate with the brushes 130. A magnet SM steps the brushes from one segment to the next by moving, when energized, the armature against its bias so as to withdraw the pawl from engagement with one tooth and dispose it behind the following tooth. When the magnet is de-energized, the bias on the armature acts through the ratchet pawl to rotate the ratchet wheel so as to advance the brushes from one set of segments to the next. A stop 138 holds the brushes against accidental rotation in the normal direction of rotation by preventing outward movement of the pawl under the camming action of one of the teeth on the ratchet. A resilient stop member 140 yieldably engages the ratchet teeth and prevents retrogressive movement of the brushes. Wipers 142 connect each of the brushes with a twenty-first or common segment in the respective banks.

The stepping switches also embody normally closed pairs of contacts SMa which are opened each time the respective stepping magnets SM are energized. An extension 144 on one of the elements of each pair of contacts is disposed in the path of a projection 146 on the respective armature so that the contacts are separated when the respective stepping magnet SM is energized.

These pairs of contacts enable the stepping switches to be used in the machine in self-controlling circuits. These circuits are obtained by connecting all but the first segment, which is the home position of the stepping switch, of a bank to the minus side of the line and the common segment 144 of that bank to the one side of the stepping magnet SM connected on its other side through the normally closed pairs of stepping magnet contacts SMI through SMVI to the plus side of the line. Thus whenever a potential is applied to the first segment of a stepping switch in its home position, the respective stepping magnet will be energized but momentarily because of the opening of the normally closed contacts, and the biased armature will advance the brush to the second segment. This will connect the stepping magnet with the minus side of the line and it will be energized momentarily again, thereby enabling the biased armature to advance the brush to the next segment. This action will be repeated until the brush has been moved past all of the segments and is again in the home position. If the potential has been withdrawn from the first segment the stepping switch will rest there until such time as a potential is again applied.

As has been stated each of forty-two character keys controls the operation of one of forty-two banks or levels of relays. This selection is obtained by disposing each set of switch contacts in two circuits of which one conditions a corresponding level or bank of each stepping switch to deliver a set of pulses and the other initiates the operation of a particular stepping switch. It will thus be seen that while six levels (one in each of the six stepping switches) are conditioned for operation each time a character key is depressed, only one is operated to deliver a set of successive impulses and that is the one in the stepping switch which is set in motion. It will also be evident that if five other key contacts are disposed in the same circuit conditioning the aforementioned set of levels, and are also disposed respectively in five circuits initiating the operation of the five other stepping switches, that five other and different levels or banks will be operated. Similarly, if six sets of key contacts are disposed in each of six circuits conditioning respectively the six other available levels or banks in each of the stepping switches and respectively in the circuits controlling the operation of the six stepping switches, 36 additional levels or banks may be selectively operated. Thus through the use of seven circuits each connected with six different sets of key contacts for conditioning respectively the seven levels or banks of each switch and six circuits each connected with seven different key contacts and initiating operation respectively of the six stepping switches, a total of forty-two selectively operative sets of successive pulses may be controlled.

When the word key WD was depressed, the key contacts were disposed in the circuits for conditioning the respective levels to deliver a set of pulses. At that time the word relay RWD was energized and it transferred the contacts RWD1 through RWD42 in the character key contact circuits. This action shifted the circuits through the key contacts away from the print magnets PM and to the wires W7 through W13, respectively in the circuits controlling the seven levels of each of the six stepping switches. The wires W7 to W13 are respectively in series with the pickup coils of level relays RL1 through RL7. When a character key is depressed, a circuit may be traced as follows: From the key power line KPL to which the minus side of the line is connected through the now closed normally open contacts RWD45, through the contact elements 3 and 1 of the respective set of key contacts, the respective transfer points of contacts RW1 through RWD42, the respective wires W7 through W13, through the pickup coils of relays RL1 through RL7, to the plus side of the line. A holding circuit is provided for the respective level relays which is so arranged that one and only one level relay can be held up at one time and thus only one group of corresponding levels or banks may be conditioned at one time.

This one and only circuit includes two normally disconnected parallelly extending branches of which one is connected to the respective level relays. The other branch is connected to the minus side of the line and is formed by a number of series connected normally closed contacts RL7b, RL6b, RL5b, RL4b, RL3b, RL2b, which are respectively controlled by the relays RL7 through RL2. The one branch in circuit with the level relays is formed by the series connected normally closed points of a number of transfer contacts RL1c through RL6c and a normally open contact RL7c, all of which are respectively controlled by the level relays RL1 through RL7. When the pickup coil of relay RL7 is energized and the normally closed contacts RL7b are opened, the normally open contact RL7c is closed and engages a point of the one branch behind the contacts RL7b to complete a circuit through contacts RL7c through RL1c and now closed normally open contacts RLa to one side of the relay RL7 hold coil connected on its other side directly to the plus side of the line. When any of the pickup coils of relays RL6 through RL2 are energized and the normally closed contacts RL6b to RL2b are opened, the corresponding contacts RL6c through RL2c are transferred and engage points on the one branch immediately behind the normally closed corresponding contacts to complete circuits to the hold coils of these level relays in similar fashion. When the pickup coil of relay RL1 is energized and contacts RL1c are transferred, they connect the end of the one branch through the transferred points of contacts RL1c and now closed contacts RL1a directly to the hold coil of that relay. It will be evident that the energization of the pickup coils of any one of the level relays will result in the completion of a circuit through the one and only one circuit by transferring the contacts RL1c through RL6c and closing the contacts RL7c in the case of the level relay RL7. The circuit will then bridge the branches at that point.

Energization of the pickup coil of a second relay will break the existing circuit through the holding coil of another level relay before setting up a new circuit through its holding coil. This will be accomplished because of the opening of the respective normally closed b contacts if the contacts of the previously energized relay are located to the relay side of it and because of the opening of the normally closed points of the respective c transfer contacts if the contacts of the previously energized relay are located toward the minus side of the line. When the contacts of the de-energized relay restore to their normal positions, a new circuit will bridge the branches through the transferred contacts of the energized relay, except of course, in the case of the level relay RL7 which closes the normally open contact RL7c to bridge the branches.

To demonstrate the operation of the level relay circuits, let it be assumed that the "A" character key was depressed and that all of the level relays had been de-energized. A circuit to the pickup coil of a level relay may be traced as follows: From the key power line KPL, which has been connected with the minus side of the line as hereinbefore explained, through the 3 and 1 elements of the "A" key contacts, the transfer points of contacts RW1, wire W7, pickup coil of level relay RL1, to the plus side of the line. The holding circuit for the level relay RL1 would be as follows: From the minus side of the line, through the normally closed contacts RFN3, the normally closed contacts RL7b through RL2b, transferred points of contact RL1c, now closed normally open points RL1a, the hold coil, to the plus side of the line.

Now let it be assumed that the "B" character key is depressed to close its set of contacts. The circuit to the pickup coil of a level relay will be as follows: From key power line KPL, contact elements 3 and 1 of the "B" key contacts, transferred points of contacts RW2, wire W8, pickup coil of relay RL2, to the plus side of the line. Before its holding circuit can be set up, relay RL2 opens its normally closed contacts RL2b to break the holding circuit for the level relay RL1. Relay RL1 now drops out and permits its contacts RL1c to restore and close its normally closed points thus completing a circuit through the holding coil of level relay RL2 through its transferred points RL2c. The holding circuit for level relay RL2 will be as follows: From the minus side of the line, through the normally closed contacts RFN3, normally closed contacts RL7b through RL3b, transferred points of contacts RL2c, now restored points of transfer contacts RL1c, normally open contacts RL2a and the hold coil, to the plus side of the line.

The level relays RL1 through RL7 condition the respective banks in each of the stepping switches by connecting the twenty-first or common segments or contacts of the respective banks to the minus side of the line. Each level relay closes, when energized, a normally open d contact (RL1d to RL7d) which is connected to a corresponding one of the wires W15 through W21 which are respectively connected to common segments on the corresponding levels or banks in each stepping switch. Wire W15 is connected to the second bank of each stepping switch, wire W16 to the third bank, etc., etc., and wire W21 to the eighth bank. The other side of each of the d contacts of the level relays is connected to the minus side of the line through the normally open RKB2 contacts held closed by the normally energized relay RKB, the parallel branch portions of the level relay one and only one circuit, and the normally closed contacts RFN3. Thus, the common segments of each of the conditioned banks of contacts in the respective stepping switches bear a minus potential.

It will be observed that, since in the home position of each stepping switch the brushes contact the first segments of the corresponding banks, a potential would be applied to that segment even though that particular stepping switch in which it occurs is not to be operative. For this reason no outlet hub is provided for the first segment in each of the 42 banks of the stepping switches used as sources of successive pulses.

A selection of one of the six conditioned levels or banks is effected by pulsing the magnet of one of the stepping switches. The contacts of each character key are disposed in one of six circuits which respectively control the operation of the six stepping switches when the word key WD has been depressed. As has been pointed out, however, each of the sets of key contacts controlling the operation of a particular stepping switch are disposed in different level relay circuits, and thus the depression of any key after the word key WD results in the sequential pulsing of its own particular set of outlet hubs.

The circuits controlling the stepping switches extend from the key power line KPL to which the minus side has been applied as hereinbefore explained, through the 3 and 2 elements of the respective set of key contacts, wires W1, W2, W3, W4, W5, W6, transfer points RWD46 through 51 respectively, the first or home position segment in a first bank of the respective stepping switches, the respective brushes, the respective common segments, the respective stepping magnets, the normally closed contacts operated by the respective stepping magnets, and the now closed normally open contacts KRB1, to the plus side of the line. Assuming that the "A" key has been depressed and level relay RL1 has been actuated as described above, a specific circuit may be traced as follows: From the key power line KPL; contact elements 3 and 2 of the "A" set of wire W1; transferred points of contacts RWD46; the first or home position segment, the brush, the common segment, and the stepping magnet SM of stepping switch I; the normally closed contacts of each of the stepping switches; and the normally open RKB1 points now closed; to the plus side of the line.

The application of a potential to the stepping magnet energizes it. It then opens the normally closed contacts to break the circuit. As pointed out before the stepping switches are of the type in which the brushes are stepped along to the next segment after the magnet has been de-energized. Since all of the remaining segments in each first bank are connected directly to the minus side of the line, each stepping magnet is actually in a self-controlling circuit. Thus when the corresponding brush engages the second segment in the first bank the magnet will again be momentarily energized because the circuit will extend from the minus side of the line through the second segment, the brush, the twenty-first or common segment, and the corresponding stepping magnet, to the plus side of the line as before. This action will be repeated through the successive segments until the brush is again disposed in the home position at which time the stepping switch will come to rest.

As the stepping switch is operated, one of its other seven banks will produce a set of pulses. The brushes of each level or bank in the stepping switch are stepped, but only the segments of that level or bank whose common segment has had a potential applied to it are successively pulsed. The levels conditioned in the other stepping switches are of no effect since their respective brushes will not be moved from the home position.

All but the first or home segment of each of the seven banks of each stepping switch capable of being conditioned to render a set of pulses are connected respectively to outlet hubs on a plugboard. The sides of the print magnets PM normally connected to the normally closed points of the transfer contacts RWD1 through RWD42 are also connected to different hubs on the plugboard. Hence, by plugging the hubs connected to the contacts of the stepping switches to various ones of the hubs connected to the print magnets, it is possible to set up the various banks to print in succession any desired combination of characters.

The circuits extending through the print magnets from the stepping switches are as follows: From the common segment and wiper and brush of the conditioned bank of a stepping switch set in motion to which the minus side of the line has been connected as explained above, through the respective bank contacts and outlet hubs, the plugwires on the plugboard, the hubs connected to the print magnets, the line end contacts LEC, the stepping magnet contacts SMVIa through SMIa, the now closed normally open contacts RKB1, to the plus side of the line. It will be observed that the relay RKA is not picked up as with the key contacts, because the pulse through the print magnets will now be limited by the opening up of the stepping magnet contacts of the stepping switch in motion.

It will be observed that complete freedom of selection is available and may be changed at will merely by adjusting plug wires. In particular it should be noted that there need be no particular relation between the character key depressed and the word written, though for the purpose of the operator's convenience, it may be desirable to do so.

After the word writing operation has been completed, the machine is automatically restored to a normal typing condition. This may be accomplished through plugging the last outlet hub of each bank or level of the stepping switch to the hub of a finish relay RFN connected on its other side directly to the plus side of the line. Thus when the brush of the conditioned bank of a stepping switch in motion engages the last segment thereof, the relay RFN is energized. Relay RFN opens the normally closed contacts RFN3 in the hold circuit for the level relays, thus causing the energized one to drop out. This dropping out action also opens the corresponding normally open b contacts of the level relay to withdraw the potential applied to each of the corresponding levels of the stepping switches. Normal typing is made available through the opening of the normally closed contacts RFN1 in the holding circuit of the word relay RWD. This causes the transfer contacts RWD1 through RWD42 to restore and directly connect each of the print magnets with their corresponding sets of key contacts.

Another means of getting the machine back to normal typing condition is employed with those banks of outlet hubs whose pulses are used to write a short word only. Since stepping switches normally go relatively slowly during the word writing operation and it is desirable to speed up machine operations, an arrangement is made enabling the resumption of normal typing before the particular stepping switch has been restored to its normal position. This arrangement involves the further plugging of the outlet hub following the last character in a word or phrase, to the hub of an end relay RED directly connected on its other side to the plus side of the line. Relay RED holds through its hold coil H which is connected on one side directly to the plus side of the line and on its other side through its normally open contact RED1 and a normally closed contact RFN2, and a normally closed contact RBB1, to the minus side of the line. The picking up of relay RED opens a normally closed contact RED2 in the holding circuit for the word relay RWD permitting the latter to drop out. The dropping out of the word relay RWD, of course, results in the restoration of the contacts RWD1 through RWD42 so that their normally closed points directly connect the print magnets with the corresponding sets of key contacts.

Another feature of the invention is to be found in the provision of means for speeding up the operation of the stepping switches after the machine has been restored to a normal typing condition at the end of a short word. In order to slow down the action of the stepping switches so as to provide sufficient time for the operation of the type bars controlled by the print magnets, the side of each stepping magnet connected to the plus side of the line through the stepping magnet controlled normally closed switches is also connected thereto through a capacitance resistance circuit. Capacitors enable a momentary additional flow of current to take place when the respective normally closed stepping magnet contacts are opened. Thus by a suitable choice of parameters the desired rate of stepping may be had of the stepping switches.

An increase in the speed of the stepping switches may therefore be obtained by dropping out a large part of the capacitance. To this end one of the combinations of resistance capacitors has been placed in series with the normally closed contacts RFN4 and RED3. Since the relay RED3 was operated at the end of the short word, the normally closed contacts RED3 have been opened and the stepping switch may be operated several times faster.

The machine is safeguarded against the picking up of a new word before the operating stepping switch has come to rest in its home position. It will be recalled that the circuit for the pickup coil of the word relay RWD contained the normally closed contacts RED1. However, the contacts RED1 are now open because relay RED has been energized and will remain so until the relay RFN is energized by the last pulse of the stepping switch and opens the normally closed pair of contacts FRN2 in the holding circuit of the relay RED.

It should be observed that the word writing capacity of this typewriter may be multiplied merely by providing additional word keys and duplicating certain elements in the electrical circuits.

*Borrowing program*

It will be apparent that in the embodiment disclosed eighteen hubs will be available in each bank of outlet hubs for the writing of words and phrases since of the twenty non-collector segments in each level or bank of a stepping switch, the first segment which the corresponding brush engages in a home position may not be wired for the reason explained hereinbefore and the last segment must be connected to operate the finish relay RFN to change the machine back to normal typing. Ordinarily 18 pulses are sufficient to handle the words or phrases used, but if more or less than such number of pulses are usually needed, stepping switches of greater or smaller capacity may be employed. In any event, instances may arise in which it is desirable to have the machine print relatively long phrases or even sentences and perhaps whole letters. To make this possible, a borrowing program has been provided.

The operating program envisages the use of two or more banks of outlet hubs to write a desired word, phrase or letter. To this end suitable means are provided for automatically effecting the pulsing of one bank of outlet hubs after another. The successive banks of outlets may be associated with other levels in the same stepping switch or any of the seven available levels in any of the five other stepping switches. In any event any combination may be obtained merely by a suitable adjustment of plug wires.

It will be recalled that the selection of a particular bank of outlets to be pulsed was made by picking up one of the seven level relays RL1 through RL7 and operating one of the six stepping magnets of one of the six stepping switches SSI through SSVI. The means for effecting the pulsing of another bank of outlets and the magnet of the appropriate stepping switch after the run of the prior stepping switch has been completed embodies the use of seven so-called column relays RC1 through RC7 of which any one may be energized to select a corresponding one of the seven level relays RL1 through RL7 for energization, six so-called row relays RR1 through RR6 of which any one may be energized to select a corresponding stepping switch magnet, and a system for picking up the selected level relay and the selected stepping magnet when the pulsing of the prior set of outlet hubs has been terminated.

The column and the row relays have been so designated because the level relays and the stepping magnets respectively controlled by them are normally controlled by the key contacts as arranged in columns and rows in the chart of Fig. 7.

The pickup coil of each of the column relays RC is connected on one side directly to the plus side of the line and on its other side to a corresponding input hub. By connecting one of these hubs to one of the second and third last hubs of the preceding bank of outlet hubs the corresponding column relay RC will be picked up near the end of the run of that preceding bank. The column relay RC holds through a one and only one circuit which is exactly like that employed with the hold coils of the level relays. The one and only one circuit knocks out the preceding level relay where more than two banks of outlets are pulsed successively. The normally closed pair of contacts RFN3 are also disposed in this hold circuit.

The energized column relay RC selects a level relay by disposing it in a circuit with a common wire which will be connected to the minus side of the line at a later time by the picking-up system. The disposition is effected by the closing of a corresponding pair of contacts which will connect one of the seven wires W7 through W13, which are in series with respective ones of the column relays, to the common line. The common wire is connectable to the minus side of the line through a normally closed pair of contacts RBA2 and a normally open pair of contacts RBB2. It will be evident that when these contacts are both closed at a later time, a potential will be applied to that level relay whose corresponding column relay has been picked up.

The pickup coil of each row relay RR also is connected on one side directly to the plus side of the line and on its other side to a corresponding hub. By connecting any one of these hubs to the other of the second and third last hubs of the preceding bank of outlet hubs the corresponding row relay also will be picked up near the end of the run of that preceding bank. The row relay which has been picked up will also hold through a one and only one circuit which is similar to that employed with the hold coils of the level relays and the column relays. It differs therefrom only in the omission of one set of b and c contacts because there is one less row relay than there are column and level relays. Like the other circuits it is also connected to the minus side of the line through the normally closed pair of contacts RFN3.

The energized row relay selects a stepping magnet in the same manner that the column relay selects a level relay, namely by disposing it in a circuit with a common wire W14 which will be connected to the minus side of the line at a later time by the picking-up system. The disposition is effected by the closing of a corresponding pair of d contacts of the row relays which will connec the first or home position segment in the first or contro bank of one of the respective stepping switches, which are in series with the respective stepping magnets, to the common wire W14. The common wire is connectable to the minus side of the line through the normally closed pair of contacts RBA3 and the normally open pair of contacts RBB3. When these contacts are both closed at a later time, a potential will be applied to the respective stepping magnet whose corresponding row relay has been picked up.

The system for picking up the selected column relay and the selected stepping magnet after the pulsing of the prior set of outlet hubs has been terminated utilizes the last pulse to emanate from that set of outlet hubs. To this end the last hub of the preceding relay is plugged to the hub of a borrowing relay RBA instead of to the finish relay RFN which when energized operates to restore the machine back to a normal typing condition. The borrowing relay RBA is connected on its other side directly to the plus side of the line, and, when energized, picks up a second borrowing relay RBB by closing a pair of contacts RBA1. The pulses which emanate from the outlet hubs of the stepping switches are of a short duration because of the stepping of the stepping switches and hence the operating relay RBA is almost immediately deenergized. This tends to result in the dropping out of the second borrowing relay RBB because of the opening of the normally open pair of contacts RBA1, but a condenser CD2 connected across the relay RBB delays this dropping out.

This delayed dropping out of the second operating relay RBB is utilized to provide pulses of sufficient duration to pick up the level relay corresponding to the energized column relay and to start the stepping of the stepping switch corresponding to the energized row relay. The pulse for picking up the level relay is obtained by the closing of the normally closed pair of contacts RBA2 upon the dropping of operating relay RBA while the normally open pair of contacts RBB2 are held closed by the energized relay RBB and by the subsequent opening of the contacts RBB2 upon the dropping of the relay RBB. The pulse for the stepping magnet is obtained by the operation of the normally closed pair of contacts RBA3 and the normally open pair of contacts RBB3 in the same manner. Thus another bank of outlets will be pulsed. Obviously it is possible to operate all of the remaining outlet banks in a similar manner merely by providing appropriate hub connections for the column relays and the row relays.

Shift circuits

The operation of the shift mechanism is effected mechanically by a depression of the shift key, and the typewriter will continue to print upper case characters as long as the key is held depressed. During normal typing operations this key is depressed manually, but after the machine has been changed to a word writing condition by the depression of the word key, the shift key depression is effected by the operation of the shift solenoid SHS. Under normal typing conditions continued printing of the upper case letters is maintained by the depression of the shift lock key; however, where the machine has been changed over to a word writing condition, such printing is maintained by continued energization of the shift solenoid SHS.

To operate the shift solenoid, an outlet hub pulse before those which are to effect a printing of upper case characters is plugged to the shift hub HSH. When this hub is pulsed, the pickup coil for a relay RSH, connected on its other side to the plus side of the line, is energized. Shift relay RSH holds by closing its normally open pair of contacts RSH1 to complete a circuit from the minus side of the line through a normally closed pair of contacts RSHR3, the now closed normally open pair of contacts RSH1, the hold coil of relay RSH, to the plus side of the line. The picking up of the shift relay RSH also closed a normally open pair of contacts RSH2 which connects the minus side of the line to the shift solenoid SHS connected on its other side directly to the plus side of the line. The shift solenoid SHS will be held energized until such time as the normally closed pair of contacts RSHR3 are opened. Obviously all the characters printed while the shift key is held in a depressed condition will be upper case characters.

Shift release circuits

When the printing of upper case characters instead of lower case characters is to be discontinued, the circuit through the holding coil of the shift relay is broken by opening of the normally closed pair of contacts RSHR3. This permits the normally open pair of contacts RSH2 to open, thus dropping out the shift solenoid SHS. Upon the release of the shift key the machine restores itself to lower case printing.

Opening of the normally closed pair of contacts RSHR3 is effected by plugging the outlet hub pulsed after those which effected a printing of the upper case letters, to the hub HSHR. This enables the energization of the pickup coil of the shift release relay RSHR which is connected on its other side directly to the plus side of the line. The hold coil of the shift release relay RSHR has a condenser CD3 connected across it and holds through its normally open pair of contacts RSHR2 and the normally open shift key contacts SH, which are now closed because the shift key is being held down by the shift solenoid SHS.

The operation of restoring the machine to print lower case characters again takes so much longer than the normal printing operation that it is desirable to stop and hold the stepping switch rather than effect an overall slowing down thereof. Therefore, an interlock is provided which removes the minus side from the stepping magnets, thus stopping them. The interlock comprises a normally closed pair of contacts RSHR1 connected in series with the relay RKB. The contacts RSHR1 are opened when the shift release relay RSHR is picked up and thus drop the relay RKB which allows the normally closed pair of contacts RKB1 in the circuit connecting the stepping magnets to the plus side of the line to open. The stepping magnets will be picked up again when the shift release relay RSHR is dropped.

The relay RSHR is dropped when the shift key restores to its raised position. This opens the shift key contacts breaking the circuit through the hold coil of relay RSHR. Condenser CD3 then discharges through the hold coil to maintain it energized for a moment longer so that the contacts RSHR1 will not close to start the stepping of the stepping switches before the shift operation has been fully completed.

Depression of the back space key, it will be recalled, trips a cam mechanism to effect a backward movement of the platen carriage. Under normal typing conditions, the key is depressed manually, however, during word writing operations the solenoid BSS is energized to pull down the back space key. Thus whenever it is desired to backspace during the word writing operation, as for example, to underline a previously printed character, the appropriate outlet hub is plugged to the backspace hub HBS. This enables a pulse to be applied to the pickup coil of the backspace relay RBS connected on its other side directly to the plus side of the line. The picking up of the relay RBS closes a normally open pair of contacts RBS3 to connect the minus side of the line directly to the backspace solenoid connected on its other side through the now closed normally open pair of contacts RKB1 to the plus side of the line. Energization of the backspace solenoid BSS effects a depression of the backspace key. The backspace mechanism is now operated in normal fashion. However, like the shift operation, its operation takes much longer than that of the printing mechanism and for this reason an interlock stopping the operation of the stepping switches must be provided. The interlock is provided by the pair of normally open contacts BSI which are closed by the backspacing mechanism during its operation as hereinbefore explained. Closure of the pair of contacts BSI completes a circuit through the now closed normally open pair of contacts RBS2, and the hold coil of the backspace relay RBS, to the plus side of the line. The backspace relay RBS will thus be held energized for the duration of the backspace operation. This results in a holding open of a normally closed pair of contacts RBS1 in circuit with the relay RKB to drop out the latter. The dropping out of the relay RKB, of course, results in an opening of the normally open pair of contacts RKB1 to remove the plus side of the line from the stepping magnet. This operation of the stepping switch will be held up until the backspace mechanism has completed its operation at which time the backspace interlock contacts BSI are opened, dropping out the backspace relay RBS. This permits the normally closed pair of contacts RBS1 to close and relay RKB to be picked up. The picking up of relay RKB again closes the normally open pair of contacts RKB1 to again apply the plus side of the line to the stepping switches. A condenser CD4 is connected across the normally closed switch RBS1. This delays the dropping out of the relay RKB sufficiently long to permit a strong pulse to be applied to the backspace solenoid BSS as the normally open pair of contacts RKB1 is in circuit therewith.

*Optional capitalization circuits*

In the use of the word writing typewriter, a word is sometimes used in a sentence where its first letter is not capitalized and sometimes at the start of a sentence where it must be capitalized. It is a feature of this invention that only one such word need be plugged up in the machine and that the choice of upper or lower case letters will be freely available. More specifically, the machine may be plugged up so that when the shift key is manually depressed along with a character key, the first letter will be capitalized and the stepping switch will be stopped until the shift key is released.

The special plugging for optional capitalization would be as follows: The first print magnet would be plugged in the usual way. However, the next outlet hub to be pulsed would be connected to the shift release hub HSHR to pick up the relay RSHR. Now if the shift key has not been manually depressed to close the normally open shift key contacts SH, the hold coil of the relay RSHR can not be picked up and thus there will be no stopping of the stepping switch. On the other hand, if the shift key has been depressed to close the shift key contacts SH, the hold coil of the relay RSHR will be energized. As has been pointed out, the energization of relay RSHR opens the contacts RSHR1 to drop the relay RKB which opens the contacts RKB1 to stop the stepping magnets. Thus as long as the shift key is held depressed, the stepping switches cannot operate. When the shift key is released, the stepping switch will again operate to continue the printing of the remainder of the word. Obviously it is possible to optionally capitalize more than one character of a word or phrase in this way.

*Tabulating circuits*

The tabulating mechanism is another of those mechanisms whose length of operation is such that it is desirable to stop and hold the stepping switch. As in the shift and the backspace mechanisms, the tabulating solenoid TBS is energized in word writing operations to depress the tabulating key. To operate the tabulating mechanism, the appropriate outlet hub is connected to a tabulating hub HTB. The hub HTB delivers the pulse to the pickup coil of a tabulating relay RTB connected on its other side directly to the plus side of the line. The picking up of relay RTB closes the normally open pair of contacts RTB3 to apply the minus side of the line to the tabulating solenoid TBS which is connected on its other side to the plus side of the line through the now closed normally open pair of contacts RKB1. Picking up of the tabulating solenoid TBS brings down the tabulating key to trip the corresponding cam mechanism. Operation of the tabulating mechanism results in a closing of the normally open pair of interlock contacts TBI which complete through now closed normally open pair of contacts RTB2, a circuit from the minus side of the line through the hold coil of the tabulating relay RTB connected on its other side to the plus side of the line. The operation of the stepping switch is stopped, as with the backspace and the shift release mechanisms, by the opening of a normally closed pair of contacts RTB1 in series with the relay RKB to drop out the latter. The dropping out of the relay RKB results in a withdrawal of the plus side of the line from the stepping magnets as before. Upon the completion of the tabulating operation the normally open pair of contacts TBI will re-open thus dropping out the relay RTB. Dropping out of relay RTB permits the normally closed pair of contacts RBTB1 to close, thus again picking up relay RKB to again apply the plus side of the line to the stepping magnets. The condenser CD4 is also connected across the normally closed pair of contacts RTB1 to delay the dropping out of the relay RKB sufficiently long to permit a pulse of the desired magnitude to pass through the tabulating solenoid TBS.

*Carriage return circuits*

The operation of the carriage return mechanism during word writing operation of the tabulating mechanism is effected by energizing the solenoid CRS. To do this, the appropriate outlet hub is plugged to a hub HCR so as to apply a pulse to the pickup coil of the carriage return relay RCR which is connected on its other side directly to the plus side of the line. The picking up of the carriage return relay RCR closes the normally open pair of contacts RCR3 to complete a circuit from the minus side of the line through the contacts RCR3, the carriage return solenoid CRS, the now closed normally open pair of contacts RKB1, to the plus side of the line. The energization of the carriage return solenoid, as explained hereinbefore, depresses the carriage return key to trip its associated cam mechanism. The cam mechanism operates to clutch in a wind-up pulley and to position the clutch knockout lever and to close the normally open pair of interlock contacts CRI, which then complete a circuit through the holding coil of the carriage return relay RCR. The circuit may be traced as follows: From the minus side of the line through the now closed pair of contacts CRI, the now closed normally open pair of contacts RCR2, the hold coil of relay RCR, to the plus side of the line. The picking up of the relay RCR also opens a normally closed pair of contacts RCR1 in series with the relay RKB to drop the latter. The dropping of the relay RKB permits the pair of contacts RKB1 to re-open and withdraw the plus side of the line from the stepping magnets as previously explained. The condenser CD4 is also connected across the normally closed pair of contacts RCR1 to delay the dropping out of the relay RKB so that a pulse of sufficient magnitude will be applied to the carriage return solenoid CRS. The carriage return relay RCR is dropped by the reopening of the contacts CRI when the clutch knockout lever is restored. Because the clutch knockout lever is restored before the carriage return operation is fully completed, a condenser CD5 is connected across the hold coil of the relay RCR to delay the re-closing of the pair of contacts RCR1. This delay is such that the relay RKB will not be picked up to re-apply the plus side of the line to the stepping magnet before the carriage return operation has been fully completed. The re-closing of the normally open pair of contacts RKB1 does not effect a re-energization of the carirage return solenoid CRS because the normally open pair of contacts RCR3 will have been opened to drop the carriage return relay RCR.

*Spacing circuits*

As is well known in the art, the depression of a space bar or key in a typewriter normally advances the platen carriage one character width in a letter spacing direction. As pointed out, in the instant machine the space solenoid SPS is employed to effect the depression of a space bar key during word writing operations.

The pulsing of an outlet hub is made to operate the space solenoid SPS directly by plugging the appropriate outlet hub to the hub HSP. The circuit from the hub HSP through the space solenoid SPS to the plus side of the line is as follows: From hub HSP through the normally closed points of transfer contacts RBE3, the space solenoid SPS, the line end contacts LEC, the normally closed contacts operated by the stepping magnets, the now closed normally open pair of contacts RKB1, to the plus side of the line. It will be seen that to connect the space solenoid to the plus side of the line a machine must be in the same condition that it is when a print magnet is operative.

It is a feature of this invention, however, that whenever a spacing operation is to take place after the platen carriage has passed the end of the line bell warning position, a carriage return operation will be automatically effected in its stead. This is brought about through the closing of a normally open pair of the so-called bell contacts BEC by the right hand margin stop at the same point that it releases the bell clapper to strike a warning bell. The margin stop holds the pair of bell contacts BEC closed all the way to the end of the line.

The closing of the pair of bell contacts BEC connects the minus side of the line to bell relay RBE connected on its other side directly to the plus side of the line. The picking up of the bell relay RBE transfers the contacts RBE3 to put the hub HSP in a circuit with the pickup coil of the carriage return relay RCR instead of in the circuit with the space solenoid SPS. The picking up of the carriage return relay operates as before to effect the operation of the carriage return mechanism and to stop and hold the stepping switch until the carriage return operation is finished. A condenser CD6 is connected across the pickup coil of the relay RCR to insure that there will be no dropping out of the relay before the carriage return interlock contacts CRI are closed.

*Conditional hyphen circuits*

It will be apparent that the pulsing of a bank of outlet hubs plugged to print a long word may be initiated at a point in the printing of the line which is too near the end of the line to permit the complete printing thereof without exceeding the right hand margin. Therefore, means have been provided to stop the printing of the word on that line, to automatically print a hyphen, to operate the carriage return mechanism, and then to resume the printing of the word on the next line. It is a feature of this invention that the hyphenation may be made at the correct place, that is, between the syllables of the word, whenever the word is being printed in the warning zone at the end of the line, and that elsewhere the provision for conditional hyphenation will have no effect on the printing of the word.

Because of the provision for conditional hyphenation, the hyphen print magnet HYPM has been connected on one side directly to the plus side of the line instead of to the plus side of the line through the now closed normally open pair of contacts RKB1 as the other character print magnets are. Thus the circuit for the hyphen print magnet will not contain the usual means for limiting the pickup time of hyphen print magnet HYPM so as to prevent reprinting. In its place, however, there has been provided a relay having a limited pickup time and operative to connect the minus side of the line to the hyphen print magnet HYPM for a corresponding period. Depression of the hyphen key HY operates a respective level relay in the same way that the other character keys do after the word key WD has been depressed, but it does not effect a direct pulsing of the hyphen print magnet when the transfer contacts RW42 have not been transferred. Instead during normal typing operations it connects the minus side of the line through a condenser CD7 and a resistor to a hyphen relay RHY connected on its other side directly to the plus side of the line.

The condenser CD7 and the resistor control the pickup time of the hyphen relay RHY. Respectively they have large values of capacitance and resistance so that the relay RHY will be held up only during the time that the condenser is being charged up. The pickup time is a constant value because once a pulse is applied to the relay RHY to pick it up, it closes its contacts RHY4 to connect the condenser and resistor directly to the minus side of the line thus permitting the condenser to charge up to its full value each time. The hyphen relay RHY connects the minus side of the line to the hyphen print magnet HYPM by closing the normally open pair of contacts RHY1. The other side of the hyphen print magnet is connected directly to the plus side of the line. Thus the pickup time of the hyphen print magnet HYPM may be controlled so as to prevent repeat operation of the hyphen type bar cam operating mechanism by suitable choice in value of the condenser CD7.

When an outlet bank has been set up to write a word or phrase which always requires the use of a hyphen, as for example, in adjective compounds, the appropriate outlet is plugged to the hub HHY. Like the key contacts HY, the hub HHY also is connected in series through the condenser CD7 and the resistor with the hyphen relay RHY and so when it is pulsed, it picks up the relay RHY which in turn picks up the hyphen print magnet HYPM. The hyphen print magnet will thus be operated in the same manner whether the hyphen character key is depressed or the hub HHY is pulsed.

To obtain the proper hyphenation of a long normally non-hyphenated word being printed in the warning zone at the end of a line, the outlet hub following those plugged for a syllable of the word, is plugged to the hub HCHY. Ordinarily, a pulse delivered to this hub effects nothing and the stepping switch merely continues the pulsing of the remainder of the outlet hubs to complete the printing of the word. However, when the machine is printing in the warning zone at the end of the line, the pulsing of the hub HCHY will result in the picking up of the hyphen relay because the bell relay RBE will have been picked up as explained hereinbefore. The energization of the bell relay RBE closes the normally open pair of contacts RBE2 to connect the hub HCHY to the hyphen relay RHY through the condenser CD7 and resistor. The relay RHY will be picked for a limited time as explained hereinbefore to effect an actuation of the hyphen print magnet HYPM.

In order to effect the automatic carriage return, the hyphen relay RHY is used to close another pair of normally open contacts RHY2 in series with the normally open pair of contacts RW43, the normally open pair of contacts RBE1, and the pickup coil of the CR relay connected on its other side directly to the plus side of the line. The normally open pair of contacts RW43 are closed when the machine is in the word writing condition and the normally open pair of contacts RBE1 are closed whenever printing is being done in the warning zone at the end of the line, so that whenever the hyphen is printed during word writing operation and in the warning zone, the carriage return operation will be automatically effected. Condenser CD6, as before, holds the pickup coil of the carriage return relay CR until the cam mechanism thereof has been operated to close the carriage return interlock contact CRI. As an additional safeguard, a normally open pair of contacts RBE4 are closed by the bell relay RBE to short circuit the carriage return interlock CRI in the holding circuit for the carriage return relay RCR to insure that the relay RCR will be held in an energized condition until the carriage return interlock contacts CRI are closed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine, a series of character printing mechanisms, a series of character keys selectively actuable to operate respective ones of the character printing mechanisms, a series of mechanisms each of which is operable to actuate different groups of said character printing mechanisms, and a control mechanism operable to render the character keys effective to operate respective ones of the series of mechanisms.

2. In a machine, a series of character printing mechanisms, a series of mechanisms each of which is operable to actuate sequentially different groups of said character printing mechanisms, a series of selectively actuable character keys, and a control mechanism adjustable between conditions in which it disposes the series of character printing mechanisms for operation by corresponding ones of said character keys and in which it disposes the series of mechanisms for operation by corresponding ones of said character keys.

3. In a machine alternately usable as a typewriter in which depression of one of a series of keys effects operation of a corresponding one of a series of type bars and as a word writer in which depression of one of the same keys effects sequential operation of a corresponding group of said type bars, first means for individually operating each of said type bars, second means for actuating said first means to operate predetermined sequences of said type bars, and third means adjustable between conditions in which it disposes said keys to actuate said first means to operate corresponding ones of said type bars and in which it disposes said keys to actuate said second means to operate corresponding groups of said type bars.

4. In a machine alternately usable as a typewriter in which depression of one of a series of keys effects operation of a corresponding one of a series of type bars and as a word writer in which depression of one of the same keys effects sequential operation of a corresponding group of type bars, a first set of individual means for operating each of said type bars, a second set of individual means for actuating different predetermined sequences of said first set of individual means, and means adjustable between conditions in which it disposes said keys to actuate corresponding ones of said first set of individual means and in which it disposes said keys to actuate corresponding ones of said second set of individual means.

5. In a machine alternately usable as a typewriter in which depression of one of a series of keys effects operation of a corresponding one of a series of type bars and as a word writer in which depression of one of the same keys effects sequential operation of a corresponding group of type bars, a first set of individual means for operating each of said type bars, a second set of individual means for actuating different predetermined sequences of said first set of individual means, and means normally operable to dispose said keys to actuate corresponding ones of said first set of individual means but adjustable to dispose said keys to actuate corresponding ones of said second set of individual means.

6. In a machine alternately usable as a typewriter in which depression of one of a series of keys effects operation of a corresponding one of a series of type bars and as a word writer in which depression of one of the same keys effects sequential operation of a corresponding group of type bars, a first set of individual means for operating each of said type bars, a second set of individual means for actuating different predetermined sequences of said first set of individual means, means normally operable to dispose said keys to actuate corresponding ones of said first set of individual means but adjustable to dispose said keys to actuate corresponding ones of said second set of individual means, and means actuable by the individual means of the second set after actuation of the different means of the first set to restore said adjustable means.

7. In a machine alternately usable as a typewriter in which depression of one of a series of keys effects operation of a corresponding one of a series of type bars and as a word writer in which depression of one of the same keys effects sequential operation of a corresponding group of type bars, a first set of individual means for operating each of said type bars, a second set of individual means each operable through a fixed cycle to actuate a number of said first set of individual means in any desired sequence, means normally operable to dispose said keys to actuate corresponding ones of said first set of individual means but adjustable to dispose said keys to actuate corresponding ones of said second set of individual means, and means actuable by the individual means of the second set at the end of its cycle to stop its operation and restore said adjustable means.

8. In a machine alternately usable as a typewriter in which depression of one of a series of keys effects operation of a corresponding one of a series of type bars and as a word writer in which depression of one of the same keys effects sequential operation of a corresponding group of type bars, a first set of individual means for operating each of said type bars, a second set of individual means each operable through a fixed cycle to actuate a number of said first set of individual means in any desired sequence, means normally operable to dispose said keys to actuate corresponding ones of said first set of individual means but adjustable to dispose said keys to actuate corresponding ones of said second set of individual means, means actuable by different individual means of the second set when operated to actuate a less than capacity number of said first set of individual means to restore said adjustable means before the end of the cycle, and means actuable by the respective individual means of the second set to stop their operation at the end of their respective cycles.

9. In a machine alternately usable as a typewriter in which depression of one of a series of keys effects operation of a corresponding one of a series of type bars and as a word writer in which depression of one of the same keys effects sequential operation of a corresponding group of type bars, a first set of individual means for operating each of said type bars, a second set of individual means each operable through a fixed cycle to actuate a number of said first set of individual means in any desired sequence, means normally operable to dispose said keys to actuate corresponding ones of said first set of individual means but adjustable to dispose said keys to actuate corresponding ones of said second set of individual means, means actuable by the individual means of the second set when operated to actuate a less than capacity number of said first set of individual means to restore said adjustable means before the end of the cycle and to speed up the operation of the individual means of the second set, and means actuable by the respective individual means of the second set to stop their operation at the end of their cycles.

10. In a word writing machine, a plurality of selectively operable type bars, a first set of individual means for operating each of said type bars, a second set of individual means each operable through a fixed cycle to actuate a number of said first set of individual means, a series of keys operable to actuate corresponding ones of said second set of individual means, and means operable by different ones of said corresponding ones of said second set of individual means to actuate other of said second set of individual means.

11. In a machine, a series of character printing mechanisms, a series of character keys selectively actuable to operate respective ones of the character printing mechanisms, a series of mechanisms each of which is operable to actuate different groups of said character printing mechanisms, a control mechanism operable to render the character keys effective to operate respective ones of the series of mechanisms, and means operable by different ones of said series of mechanisms to actuate other of said series of mechanisms.

12. In a machine alternately useable as a typewriter and as a word writer and having a plurality of selectively operable type bars and machine function systems, a corresponding series of keys, a first set of individual means for operating each of said type bars and machine function systems, a second set of selectively operable individual means for actuating different predetermined sequences of said first set of means, means adjustable between conditions in which it disposes said keys to actuate respective ones of said first set of individual means and in which it disposes said keys to actuate respective ones of said second set of individual means, and means actuable by a machine function system to stop and hold the operating one of said second set of individual means until the function has been completed.

13. In a machine alternately useable as a typewriter and as a word writer and having a line end position and means for indicating the approach of that position, a plurality of selectively operable type bars and spacing and carriage return systems, a corresponding series of keys, a first set of individual means for operating each of said type bars and said spacing and carriage return systems, a second set of individual means for actuating different predetermined sequences of said first set of individual means, means adjustable between conditions in which it disposes said keys to actuate respective ones of said first set of individual means and in which it disposes said keys to actuate respective ones of said second set of individual means, and means operable by said line end approach indicating means to render the carriage return system operating one of the first set of individual means actuable instead of the spacing operating one of the first set of individual means by the respective ones of the second set of individual means.

14. In a machine alternately useable as a typewriter and as a word writer and having a line end position and means for indicating the approach of that position, a plurality of selectively operable type bars including a hyphen one and a carriage return system, a corresponding series of keys, a first set of individual means for operating each of said type bars and said carriage return system, a second set of individual means for actuating different predetermined sequences of said first set of individual means, means adjustable between conditions in which it disposes said keys to actuate respective ones of said first set of individual means and in which it disposes said keys to actuate respective ones of said second set of individual means, and means operable by the line end approach indicating means to render the carriage return system operating one of the first set of individual means actuable along with the hyphen type bar operating one of the first set of individual means by the respective ones of the second set of individual means.

15. In a machine alternately useable as a typewriter and as a word writer and having a line end position and means for indicating the approach of that position, a plurality of selectively operable type bars including a hyphen one, a corresponding series of keys, a first set of individual means for operating each of said type bars, a normally non-responsive means operable to actuate the hyphen type bar actuating means of the first set of individual means, a second set of individual means for actuating different predetermined sequences of said first set of individual means and said normally non-responsive means, means adjustable between conditions in which it disposes said keys to actuate respective ones of said first set of individual means and in which it disposes said keys to actuate respective ones of said second set of individual means, and means operable by the line end approach indicating means to render the normally non-responsive means responsive to the respective ones of the second set of individual means.

16. In a machine alternately useable as a typewriter and as a word writer and having a line end position and means for indicating the approach of that position, a plurality of selectively operable type bars including a hyphen one and a carriage return system, a first set of individual means for operating each of said type bars and said carriage return system, a corresponding series of keys, a normally non-responsive means operable to actuate the hyphen type bar operating one and the carriage return system operating one of the first set of individual means, a second set of individual means for actuating different predetermined sequences of said first set of individual means and the normally non-responsive means, means adjustable between conditions in which it disposes said keys to actuate respective ones of said first set of individual means and in which it disposes said keys to actuate respective ones of said second set of individual means, and means operable by the line end approach indicating means to render said normally non-responsive means responsive to the respective ones of the second set of individual means.

17. In a word writing machine, a plurality of selectively operable type bars, individual electromagnetic means for operating each of said type bars, a number of stepping switches each having a plurality of banks of contacts and corresponding brushes and electromagnetic means for advancing the brushes of each bank from one set of contacts to the next, a first set of individual means operable to energize repeatedly each stepping switch electromagnetic means until the respective brushes have been moved past all of the contacts in each bank, means electrically connecting contacts of each bank with different ones of said individual electromagnetic means, means connecting sources of electrical energy in circuit with each of the brushes and the associated individual electromagnetic means, a second set of individual means operative to close the circuits through corresponding brushes in each stepping switch, and a series of keys respectively operable to actuate different combinations of said first and second set of individual means.

18. In a word writing machine, a plurality of selectively operable type bars, individual electromagnetic means for operating each of said type bars, a number of stepping switches each having a plurality of banks of contacts and corresponding brushes and electromagnetic means for advancing the brushes of each bank from one set of contacts to the next, said stepping switches each having home positions in which the respective brushes each rest in engagement with one of the contacts of the corresponding bank, means connecting sources of electrical energy in separate circuits with each stepping switch electromagnetic means and a brush and the corresponding bank of contacts in the respective stepping switch, the circuits through the home position contacts normally being open, a first set of individual means operable to close each of said normally open circuits to initiate action of the associated electromagnetic means, means electrically connecting various contacts of the other banks in each stepping switch with different ones of said individual electromagnetic means, a second set of individual means each operable to connect a source of electrical energy in circuits with each of the other brushes and the associated individual electrical magnetic means, and a series of keys respectively operable to actuate different combinations of said first and said second set of individual means.

19. In a word writing machine, a plurality of selectively operable type bars, individual electromagnetic means for operating each of said type bars, a number of stepping switches each having a plurality of banks of contacts and corresponding rotatable brushes and a magnet embodying a biased armature and a ratchet and pawl assembly of which the ratchet is fixed to rotate with the brushes and the pawl is pivoted and biased on the armature so as to engage behind a following tooth when the magnet is energized and to advance the brushes from one set of contacts to the next when the armature restores under the influence of its bias, said stepping switches each having home positions in which the respective brushes each rest in engagement with one of the contacts of the corresponding bank, means connecting a source of electrical energy in separate circuits with each magnet and a brush and the corresponding bank of contacts in the respective stepping switch, a normally closed pair of contacts in the common portion of the circuit for each magnet movable to open position by the energization of the respective magnet to drop the magnet and thus permit the stepping of the associated brushes by the biased armature, a normally open pair of contacts in each of the magnet circuits through the home position contacts, a first set of relays for closing respectively the normally open pairs of contacts, means electrically connecting various contacts of the other banks in each stepping switch with different ones of said individual electromagnetic means, means connecting sources of electrical energy in circuits with each of the other brushes and the associated individual electromagnetic means, said circuits for corresponding banks in each stepping switch being commoned through individual normally open pairs of contacts, a second set of relays operable to close respective ones of said individual normally open pairs of contacts, and a series of keys respectively operable to pick up different combinations of said first and second set of relays.

20. In a word writing machine, a plurality of selectively operable type bars, individual electromagnetic means for operating each of said type bars, a number of stepping switches, each having a plurality of banks of contacts and corresponding rotatable brushes and a magnet embodying a biased armature and a ratchet and pawl assembly of which the ratchet is fixed to rotate with the brushes and the pawl is pivoted and biased on the armature so as to engage behind a following tooth when the magnet is energized and to advance the brushes from one set of contacts to the next when the armature restores under the influence of its bias, said stepping switches each having home positions in which the respective brushes each rest in engagement with one of the contacts of the corresponding bank, means connecting a source of electrical energy in separate circuits with each magnet and a brush and the corresponding bank of contacts in the respective stepping switch, a normally closed pair of contacts in the common portion of the circuit for each magnet movable to open position by the energization of the respective magnet to drop the magnet and thus permit the stepping of the associated brushes by the biased armature, a normally open pair of contacts in each of the magnet circuits through the home position contacts, a first set of relays for closing respectively the normally open pair of contacts, means electrically connecting various contacts of the other banks in each stepping switch with different ones of said individual electromagnetic means, means connecting a source of electrical energy in circuit with each of the other brushes and the associated individual electromagnetic means, said circuits for corresponding banks in each stepping switch being commoned through individual normally open pairs of contacts, a second set of relays operable to close respective ones of said individual normally open pairs of contacts, a series of keys respectively operable to pick up different combinations of said first and second set of relays, normally closed contacts in the circuits of each of said first and second set of relays, a relay controlling the operation of these normally closed contacts, and means electrically connecting the last contact of each of said other banks with said last mentioned relays.

References Cited in the file of this patent

UNITED STATES PATENTS

| | | |
|---|---|---|
| 942,825 | Hauerstein | Dec. 7, 1909 |
| 2,217,150 | Ayres | Oct. 8, 1940 |
| 2,378,371 | Tholstrup | June 12, 1945 |